US008588068B2

(12) United States Patent
Kobayashi

(10) Patent No.: US 8,588,068 B2
(45) Date of Patent: Nov. 19, 2013

(54) COMMUNICATION TERMINAL AND COMMUNICATION METHOD

(75) Inventor: Hirokazu Kobayashi, Tokyo (JP)

(73) Assignee: Panasonic Corporation, Osaka (JP)

( * ) Notice: Subject to any disclaimer, the term of this patent is extended or adjusted under 35 U.S.C. 154(b) by 193 days.

(21) Appl. No.: 13/201,059

(22) PCT Filed: Oct. 27, 2010

(86) PCT No.: PCT/JP2010/006357
§ 371 (c)(1),
(2), (4) Date: Aug. 11, 2011

(87) PCT Pub. No.: WO2011/052201
PCT Pub. Date: May 5, 2011

(65) Prior Publication Data
US 2012/0188887 A1   Jul. 26, 2012

(30) Foreign Application Priority Data

Nov. 2, 2009   (JP) .................................. 2009-252237

(51) Int. Cl.
*G01R 31/08* (2006.01)
(52) U.S. Cl.
USPC ............................ 370/230; 370/235; 370/392
(58) Field of Classification Search
CPC .................. H04L 29/06095; H04L 29/06115; H04L 29/06102; H04L 29/06136; H04L 47/10
See application file for complete search history.

(56) References Cited

U.S. PATENT DOCUMENTS

| | | | |
|---|---|---|---|
| 6,038,606 A * | 3/2000 | Brooks et al. ................. | 709/235 |
| 6,078,564 A | 6/2000 | Lakshman et al. | |
| 7,145,887 B1 * | 12/2006 | Akgun et al. ................. | 370/321 |
| 2006/0176862 A1 | 8/2006 | Ishimori et al. | |
| 2008/0019340 A1 | 1/2008 | Ohta et al. | |
| 2010/0220702 A1 | 9/2010 | Hiroyuki et al. | |
| 2011/0044338 A1 | 2/2011 | Stahl et al. | |

FOREIGN PATENT DOCUMENTS

| | | |
|---|---|---|
| JP | 06132981 A | 5/1994 |
| JP | 10-126446 A | 5/1998 |
| JP | 2000-022744 A | 1/2000 |

(Continued)

OTHER PUBLICATIONS

Hirokazu Takahashi, et al., "Linux Kernel 2.6 Deciphering Room", SOFTBANK Creative Corp., Nov. 30, 2006 (p. 433).
NN: New registry entry for controlling the TCP Acknowledgement (ACK) behavior in Windows XP and in Windows Server 2003, retrrerived from the Internet: Feb. 12, 2013.
European Search Report for Application No. 10826337.7-1853/249474 dated Feb. 26, 2013.

(Continued)

*Primary Examiner* — Jung Park
(74) *Attorney, Agent, or Firm* — Pearne & Gordon LLP

(57) ABSTRACT

In a situation where a communication line is busy in a TCP communication, or in a situation where TCP data is continuously received, divided transmission of TCP-ACK is suppressed. A communication terminal includes a transmission standby frequency estimation unit 103 that estimates a transmission standby frequency of the TCP-ACK according to the situation of the communication line and a TCP-ACK generation control unit 106 that controls the generation frequency of the TCP-ACK on the basis of the estimated transmission standby frequency estimate information. The TCP-ACK generation control unit 106 adjusts the generation frequency of the TCP-ACK so as to reduce the generation frequency of the TCP-ACK if the transmission standby frequency is higher than a predetermined value.

6 Claims, 15 Drawing Sheets

(56) References Cited

FOREIGN PATENT DOCUMENTS

| | | |
|---|---|---|
| JP | 2000-101578 A | 4/2000 |
| JP | 2004-364217 A | 12/2004 |
| JP | 2005-278001 A | 10/2005 |
| JP | 2010-141769 A | 6/2010 |
| JP | 2010-522468 A | 7/2010 |
| WO | 2006/107046 A1 | 10/2006 |

OTHER PUBLICATIONS

IEEE Std802.11-2007, part 11: Wireless LAN Medium Access Control (MAC) and Physical Layer (PHY) Specifications, Jun. 12, 2007 (pp. 261-267).

International Search Report for PCT/JP2010/006357 dated Feb. 1, 2011.

* cited by examiner

US 8,588,068 B2

COMMUNICATION TERMINAL AND COMMUNICATION METHOD

TECHNICAL FIELD

The present invention relates to a communication terminal and a communication method using a TCP protocol (transmission control protocol) through a half-duplex transmission path.

BACKGROUND ART

As transfer protocols for transferring electronic files or content, a TCP protocol has been in widespread use. In the TCP protocol, when TCP segment data (hereinafter referred to as "TCP-DATA") of a transmission unit, which is transmitted by a transmitter terminal, normally arrives at a receiver terminal in a TCP layer of a network, a delivery acknowledgement (TCP acknowledgement), hereinafter referred to as "TCP-ACK") as a TCP protocol is returned from the receiver terminal to the transmitter terminal to ensure reliability.

Also, the following communication efficiency is conducted in the TCP protocol. In the transmitter terminal, even if the TCP-ACK is not received under a window control, TCP-DATA is continuously transmitted. In the receiver terminal, a technique called "delayed acknowledgement (delayed ack)" is used. In general, the receiver terminal is implemented to transmit the TOP-ACK upon receiving two segments of TCP-DATA having the maximum length (for example, refer to Non Patent Literature 1).

Also, as data communication means, wireless LAN systems have been in widespread use from the viewpoint of convenience. FIG. 14 illustrates an example of a data communication system when a wireless LAN is used. A terminal (wireless LAN terminal) 1501 using the wireless LAN is located in a wireless LAN communication area 1504 that enables communication with a wireless LAN access point 1502, and connected to a communication network 1505 through the wireless LAN access point 1502.

Also, the wireless LAN access point 1502 is generally connected to the communication network 1505 via wired media such as Ethernet (registered trademark) or an optical fiber. The communication network 1505 includes, for example, the internet, the intranet, a residential network, and a public infrastructure network that is managed by a carrier. Also, the communication network 1505 is connected with a communication partner terminal 1503, and the wireless LAN terminal 1501 and the communication partner terminal 1503 enable data communication with each other through the communication network 1505 according to the TCP protocol.

The wireless LAN system generally in widespread use is of a system stipulated in IEEE 802.11. Also, an access algorithm realized in an MAC layer is based on a CSMA/CA (carrier sense multiple access with collision avoidance) system (for example, refer to Non Patent Literature 2). In the CSMA/CA system, a terminal that is going to transmit data implements carrier sense for determining whether communication media (wireless media in this case) is used, or not.

A transmission right of data is acquired only when that the communication media is not used in a predetermined period (carrier free) can be confirmed as a result of the carrier sense. When transmission from another terminal is detected during the carrier sense, transmission from a subject terminal is delayed until the carrier free is detected (for example, refer to Non Patent Literature 2).

CITATION LIST

Non Patent Literature

Non Patent Literature 1: Hirokazu Takahashi, et. al., "Linux Kernel 2.6 Deciphering Room", SOFTBANK Creative Corp, Nov. 30, 2006 (P433)

Non Patent Literature 2: IEEE Std802.11-2007, part 11: Wireless LAN Medium Access Control (MAC) and Physical Layer (PHY) Specifications, Jun. 12, 2007 (PP 261 to 267).

SUMMARY OF INVENTION

Technical Problem

It is assumed that a communication traffic is large or data is transferred in a bursty manner when media access is executed through a CSMA/CA system as in the wireless LAN. In this situation, the subject communication terminal receives another TCP segment data from the wireless LAN access that is a destination while attempting to acquire the transmission right in the MAC layer for transmitting the TCP-ACK generated in the subject communication terminal.

In this case, the subject communication terminal waits for transmission of the TCP-ACK, and attempts to acquire the transmission right of the waiting TCP-ACK again after receiving the TCP segment data. After acquiring the transmission right, the subject communication terminal outputs the TCP-ACK to the communication media, and completes the transmission.

FIG. 15 is a sequence diagram illustrating an example of data transfer operation between the transmitter terminal and the receiver terminal when data is transferred in a bursty manner. In FIG. 15, the communication partner terminal 1503 in FIG. 14 is the transmitter terminal, and the wireless LAN terminal (subject communication terminal) 1501 is the receiver terminal. As described above, the communication partner terminal 1503 at the TCP segment data transmitter side and the wireless LAN access point 1502 are generally connected to each other through a wired network such as Ethernet (registered trademark), which is generally higher in transmission capability than the wireless LAN.

In an example shown in the figure, TCP-DATA #1 to TCP-DATA #8 are transmitted in a bursty manner from the communication partner terminal 1503 (transmitter terminal). The wireless LAN terminal 1501 (receiver terminal) generates respective TCP-ACK at the time of receiving the TCP-DATA #2, the TCP-DATA #4, the TCP-DATA #6, and the TCP-DATA #8. Because the TCP-DATA is transmitted in a bursty manner from the transmitter terminal to the receiver terminal through the wireless LAN access point 1502, the receiver terminal cannot acquire the transmission right of the communication media, and delays the transmission of the TCP-ACK.

When the receiver terminal transmits the TCP-ACK that is acknowledgement of the TCP-DATA #1 and the TCP-DATA #2, the receiver terminal sequentially transmits the respective TCP-ACK although the receiver terminal has already normally received new TCP segment data. Accordingly, although the receiver terminal has already received the new TCP segment data, the TCP-ACK is separately transmitted to the transmitter terminal of the TCP-DATA. As a result, the conventional method suffers from such a problem that throughput of a system is deteriorated, and a power consumption of the communication terminal is increased.

The present invention has been made under the above circumstances, and aims at providing a communication terminal and a communication method, which can suppress the divided transmission of the TCP acknowledgement (TCP-ACK) in the TCP communication, and efficiently execute the acknowledgement.

Solution to Problem

According to the present invention, there is provided a communication terminal which communicates with at least one communication terminal by using a TCP protocol, including a transmission standby frequency estimation unit that estimates a frequency at which transmission standby is executed since transmission data including a TCP acknowledgement segment arrives at a media access control processing unit of a subject communication terminal until the TCP acknowledgement segment is transmitted to communication media; and a TCP acknowledgement generation control unit that changes a generation frequency of the TCP acknowledgement segment on the basis of the estimated transmission standby frequency information, wherein the TCP acknowledgement generation control unit decreases the generation frequency of the TCP acknowledgement segment when the transmission standby frequency estimation unit estimates that the transmission standby frequency is higher than a predetermined value.

With this configuration, under circumstances where transmission standby of the TCP acknowledgement segment (TCP-ACK) is liable to occur, that is, in a situation where a detention frequency of the transmission data is high, thereby making it difficult to obtain the transmission right immediately, a generation timing of the TCP-ACK is delayed whereby one TCP-ACK can notify the transmitter side of the reception acknowledgement of more pieces of TCP segment data. For that reason, the divided transmission of the TCP-ACK is suppressed in the TCP communication, and the acknowledgement can be efficiently conducted.

Also, according to the present invention, there is provided a communication method in a communication terminal which communicates with at least one communication terminal by using a TCP protocol, the communication method including the steps of: estimating a frequency at which transmission standby is executed since transmission data including a TCP acknowledgement segment arrives at a media access control processing unit of a subject communication terminal until the TCP acknowledgement segment is transmitted to communication media; and changing a generation frequency of the TCP acknowledgement segment so as to decrease the generation frequency of the TCP acknowledgement segment when it is estimated that the transmission standby frequency is higher than a predetermined value, on the basis of the estimated transmission standby frequency information.

With this configuration, under circumstances where transmission standby of the TCP acknowledgement segment (TCP-ACK) is liable to occur, that is, in a situation where a detention frequency of the transmission data is high, thereby making it difficult to obtain the transmission right immediately, a generation timing of the TCP-ACK is delayed whereby one TCP-ACK can notify the transmitter side of the reception acknowledgement of more pieces of TCP segment data. For that reason, the divided transmission of the TCP-ACK is suppressed in the TCP communication, and the acknowledgement can be efficiently conducted.

Advantageous Effects of Invention

According to the present invention, there can be provided the communication terminal and the communication method, which can suppress the divided transmission of the TCP acknowledgement (TCP-ACK) in the TCP communication, and efficiently execute the acknowledgement.

DESCRIPTION OF EMBODIMENTS

Hereinafter, embodiments of the present invention will be described with reference to the drawings.

In the embodiments, a communication terminal and a communication method, which conduct communication through a half-duplex transmission path, is exemplified by configuration examples in a wireless LAN system. In the embodiments, a case in which a communication terminal, which is a communication device applied to a wireless LAN terminal, communicates with a communication partner terminal through a wireless LAN access point is exemplified. In this case, it is assumed that the communication partner terminal is a transmitter terminal, and the wireless LAN terminal (subject communication terminal) is a receiver terminal.

First Embodiment

Figure 1:
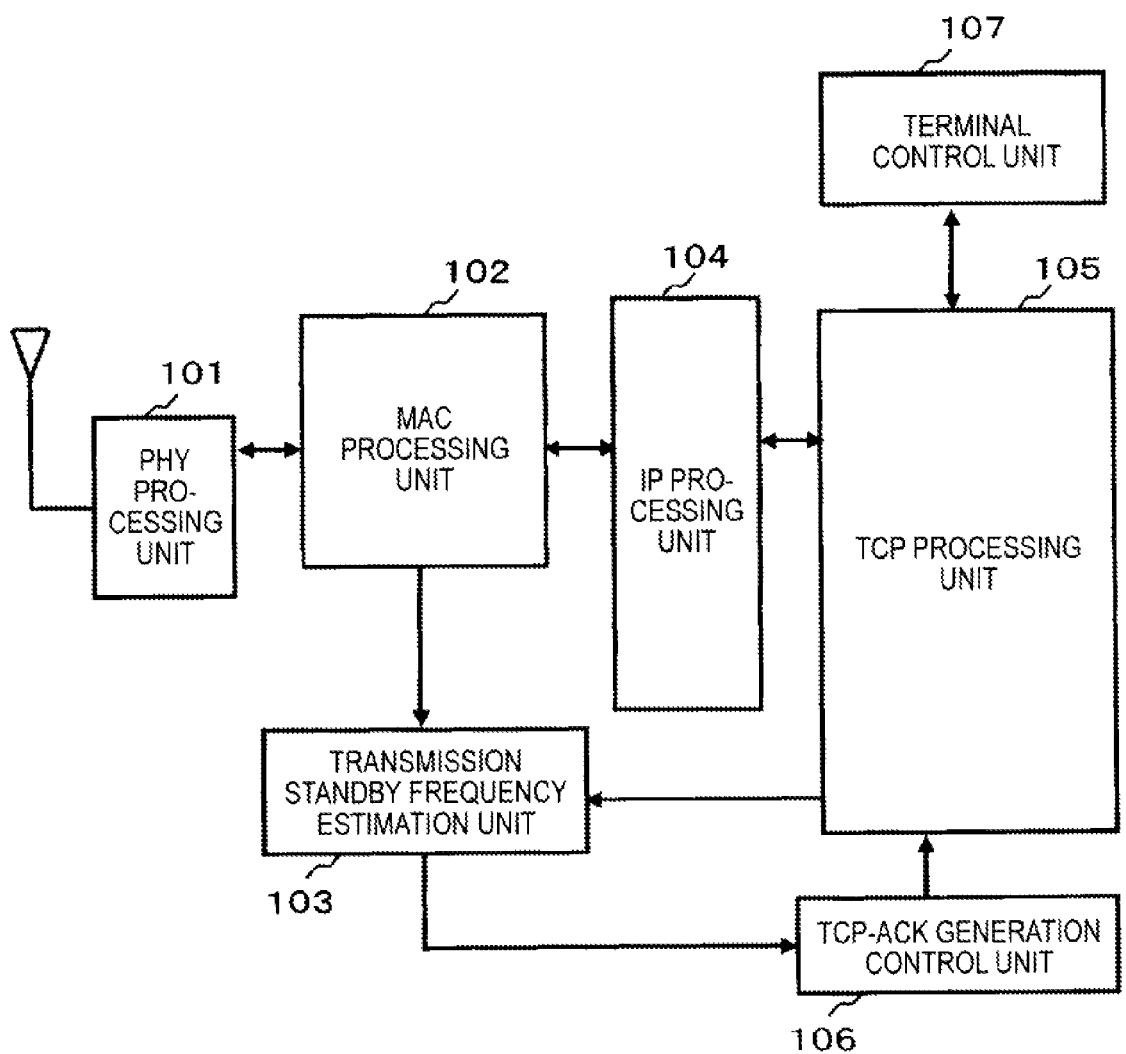
FIG. 1 is a block diagram illustrating a configuration of a communication terminal according to a first embodiment of the present invention.

FIGS. 1 to 4 illustrate an example of a communication terminal and a communication method according to a first embodiment of the present invention. FIG. 1 is a block diagram illustrating a configuration of a communication terminal according to the first embodiment.

The communication terminal includes a PHY processing unit 101, a MAC processing unit 102, a transmission standby frequency estimation unit 103, an IP processing unit 104, a TCP processing unit 105, a TCP-ACK generation control unit 106, and a terminal control unit 107.

The PHY processing unit 101 conducts physical layer processing such as data transmission and reception with respect to a communication media, modulation and demodulation, and encoding. The MAC processing unit (media access control processing unit) 102 conducts access control processing to the communication media. The IP processing unit 104 conducts processing associated with an IP layer such as a header analysis or allocation of the IP layer.

The TCP processing unit 105 conducts processing associated with a TCP layer such as transmission or reception processing of TCP segment data, or generation processing of a TCP-ACK (TCP acknowledge segment) which is a delivery acknowledgement. The TCP-ACK generation control unit 106 functioning as a TCP acknowledgement generation control unit controls a timing of the TCP-ACK generation according to a status of the communication media. The terminal control unit 107 conducts higher layer processing of a network and management processing of the terminal.

Although not shown, this communication terminal includes keys and a display, which are user interfaces for allowing a user of the communication terminal to selectively execute the operation of this communication terminal. This communication terminal also includes components such as a microphone, a speaker, and a camera for speech processing, a vibrator, and a memory for storage and execution of a program.

The MAC processing unit 102 conducts access control processing to a communication media. Also, the MAC processing unit 102 conducts the MAC layer processing of a receive frame acquired from the PHY processing unit 101 to deliver the processing results to the IP processing unit 104, and the MAC layer processing of a transmit packet acquired from the IP processing unit 104 to deliver the processing results to the PHY processing unit 101. The MAC processing unit 102 also has a function of notifying the transmission standby frequency estimation unit 103 of data received from the destination wireless LAN access point.

The transmission standby frequency estimation unit 103 calculates detention estimate information indicative of how long the transmission of the transmit packet received from the IP processing unit 104 by the MAC processing unit 102 is retained, and notifies the TCP-ACK generation control unit 106 of the calculated detention estimate information. The detention estimate information is transmitted to the TCP-ACK generation control unit 106 as the transmission standby frequency information.

Figure 2:
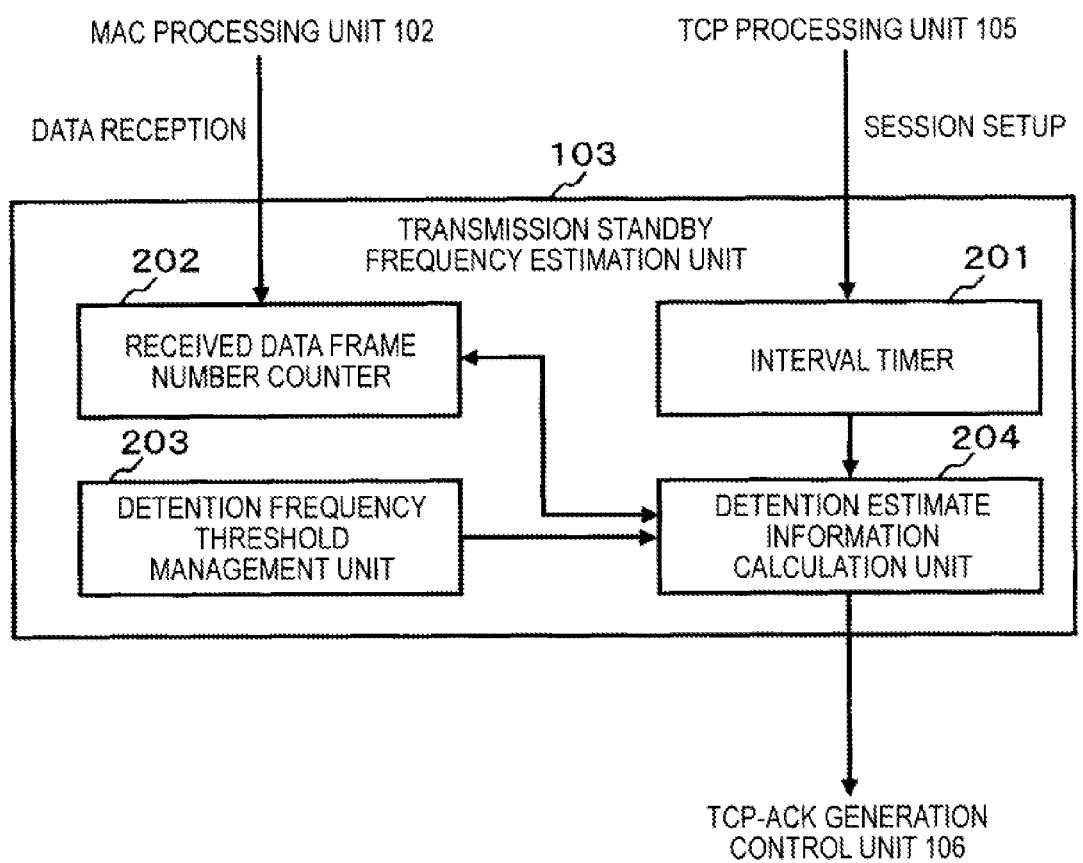
FIG. 2 is a block diagram illustrating a configuration of a transmission standby frequency estimation unit according to the first embodiment.

FIG. 2 is a block diagram illustrating a configuration of the transmission standby frequency estimation unit 103 according to the first embodiment. The transmission standby frequency estimation unit 103 includes an interval timer 201, a received data frame number counter 202, a detention frequency threshold management unit 203, and a detention estimate information calculation unit 204.

The interval timer 201 starts upon receiving a data receive session setup notice from the TCP processing unit 105, and notifies the detention estimate information calculation unit 204 of a timer expiration notice based on a given interval value. The interval value is set to, for example, the same value as a beacon interval from the wireless LAN access point, or a fixed value.

The received data frame number counter 202 increments a counter value by 1 upon receiving the data receive notice from the MAC processing unit 102. Also, the received data frame number counter 202 initializes the counter value with the timer expiration of the interval timer 201. The initialization of the counter value is implemented according to an instruction of the detention estimate information calculation unit 204. The interval timer 201 and the received data frame number counter 202 realize a function of a received data number calculation unit for calculating the number of received data in a predetermined period.

The detention frequency threshold management unit 203 manages a threshold value for defining a level of the detention frequency according to a counter value of the received data frame number counter 202. For example, the detention frequency threshold management unit 203 defines the detention frequency to three levels consisting of level 1 (small), level 2 (medium), and level 3 (large). The detention frequency threshold management unit 203 sets a boundary value between the level 1 and the level 2 to twice as large as the TCP-ACK generation frequency in a normal state, that is, four in the number of received data frames. The detention frequency threshold management unit 203 sets a boundary value between the level 2 and the level 3 to three times as large as the TCP-ACK generation frequency in the normal state, that is, six in the number of received data frames.

The detention estimate information calculation unit 204 refers to the counter value of the received data frame number counter 202 and threshold value information upon receiving the timer expiration notice from the interval timer 201. As a result of referring to those information, the detention estimate information calculation unit 204 determines to which detention frequency level the received data frame number counter value belongs, notifies the TCP-ACK generation control unit 106 of the determination result, and instructs the received data frame number counter 202 to initialize the counter value.

Thus, the transmission standby frequency estimation unit 103 according to this embodiment always counts a given interval after the TCP session is established, and the data receive session is set up, and calculates the number of received data in a predetermined period. Further, the transmission standby frequency estimation unit 103 determines the detention frequency level on the basis of the number of received data frames for each interval. Also, the transmission standby frequency estimation unit 103 notifies the TCP-ACK generation control unit 106 of the detention frequency level as the detention estimate information.

Upon setting up the session for receiving the TCP segment data, the TCP processing unit 105 notifies the transmission standby frequency estimation unit 103 of the data receive session setup. Also, the TCP processing unit 105 changes, on the basis of a notice from the TCP-ACK generation control unit 106, an ACK parameter for managing how many TCP segment data should be normally received from the IP layer in order to generate the TCP-ACK.

The TCP processing unit 105 sets the generation timing of the TCP-ACK in a ordinary state to a timing after receiving two segments, four segments, or six segments of the TCP segment data, according to the change in the ACK parameter. In general, the TCP-ACK is generated after one segment is received in a congestion state, and the TCP-ACK is generated after two segments are received in the ordinary state. The ordinary state is indicative of a congestion avoidance state except for the session setup or release, or a slow start time.

The TCP-ACK generation control unit 106 instructs the TCP processing unit 105 to change the ACK parameter for managing the generation frequency of the TCP-ACK on the basis the detention estimate information (transmission standby frequency information) received from the transmission standby frequency estimation unit 103. The detention estimate information represents the size of the received data frame number for each given interval by a plurality of levels as described above, and indicates how many subsequent TCP segment data has been received while waiting for transmission of the TCP-ACK.

That is, when the TCP-ACK is generated after two segments of the TCP segment data are received at a normal generation frequency, the detention estimate information corresponds to information indicative of a detention degree (detention frequency, that is, transmission standby frequency) since the TCP-ACK is generated until the TCP-ACK can be transmitted. For example, when the transmission standby frequency is higher than the predetermined value, the generation frequency is so controlled as to decrease the generation frequency of the TCP-ACK. When the transmission standby frequency is lower than the predetermined value, the generation frequency is so controlled as to increase the generation frequency of the TCP-ACK.

Thus, the ACK parameter is changed on the basis of the detention estimate information to adjust the generation frequency of the TCP-ACK whereby the generation timing of the TCP-ACK can be controlled to enable the TCP-ACK to be generated and transmitted according to the use condition of the transmission path.

The operation of the communication terminal according to the first embodiment configured as described above will be described below.

Figure 3:
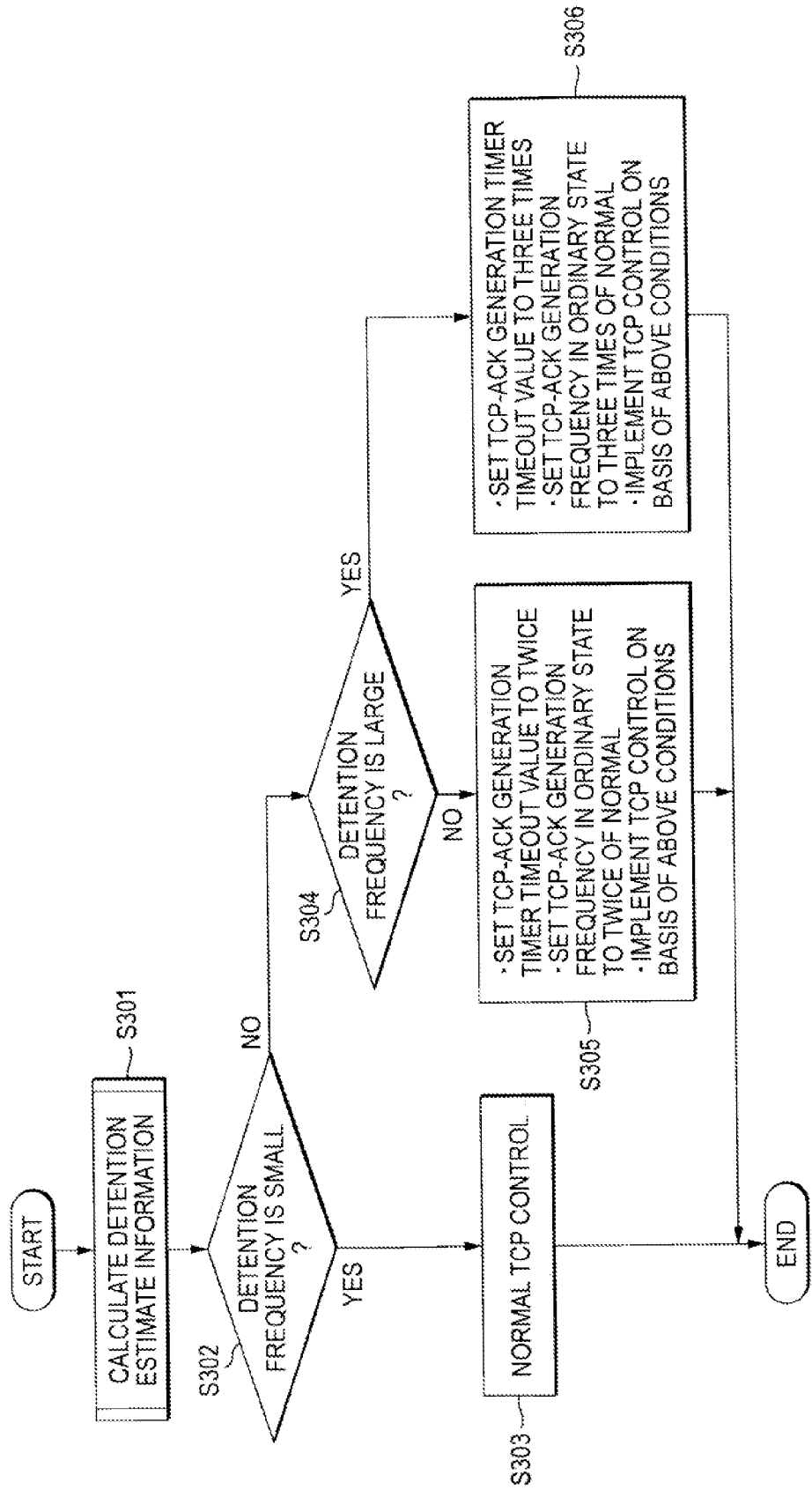
FIG. 3 is a flowchart for changing a generation timing of TCP-ACK according to the first embodiment.

FIG. 3 is a flowchart for changing the generation timing of the TCP-ACK in the communication terminal according to the first embodiment.

Upon starting the TCP communication, the communication terminal calculates the detention estimate information in the transmission standby frequency estimation unit 103, and notifies the TCP-ACK generation control unit 106 of the detention estimate information (Step S301). The TCP-ACK generation control unit 106 determines the detention frequency from the detention estimate information, and conducts the following processing according to the detention frequency.

If the detention frequency is small, that is, if the determination in Step S302 is yes, the TCP-ACK generation control unit 106 sets the ACK parameter to a default value, and the TCP processing unit 105 conducts the TCP communication by the normal TCP parameter (Step S303). When the ACK parameter is the default value, the TCP processing unit 105 generally generates one TCP-ACK every time receiving two TCP segments in the ordinary state.

If the detention frequency is medium, that is, if the determination in Step S302 is no, and the determination in Step S304 is no, the TCP-ACK generation control unit 106 sets the ACK parameters. The TCP-ACK generation control unit 106 sets, as the ACK parameters, a TCP-ACK generation timer timeout value and a TCP-ACK generation frequency (the number of TCP segments received for generating the TCP-ACK) to twice of the default values.

Then, the TCP processing unit 105 conducts the TCP communication by the set TCP parameter (Step S305). In this case, if the TCP processing unit 105 generates one TCP-ACK every time receiving two TCP segments in the ordinary state when the TCP parameters are the default values, the TCP processing unit 105 generates one TCP-ACK every time receiving four TCP segments.

If the detention frequency is large, that is, if the determination in Step S304 is yes, the TCP-ACK generation control unit 106 sets, as the ACK parameters, the TCP-ACK generation timer timeout value and the TCP-ACK generation frequency to three times of the default values. Then, the TCP processing unit 105 conducts the TCP communication by the set TCP parameters (Step S306).

In this case, if the TCP processing unit 105 generates one TCP-ACK every time receiving two TCP segments in the ordinary state when the TCP parameters are the default values, the TCP processing unit 105 generates one TCP-ACK every time receiving six TCP segments.

Figure 4:
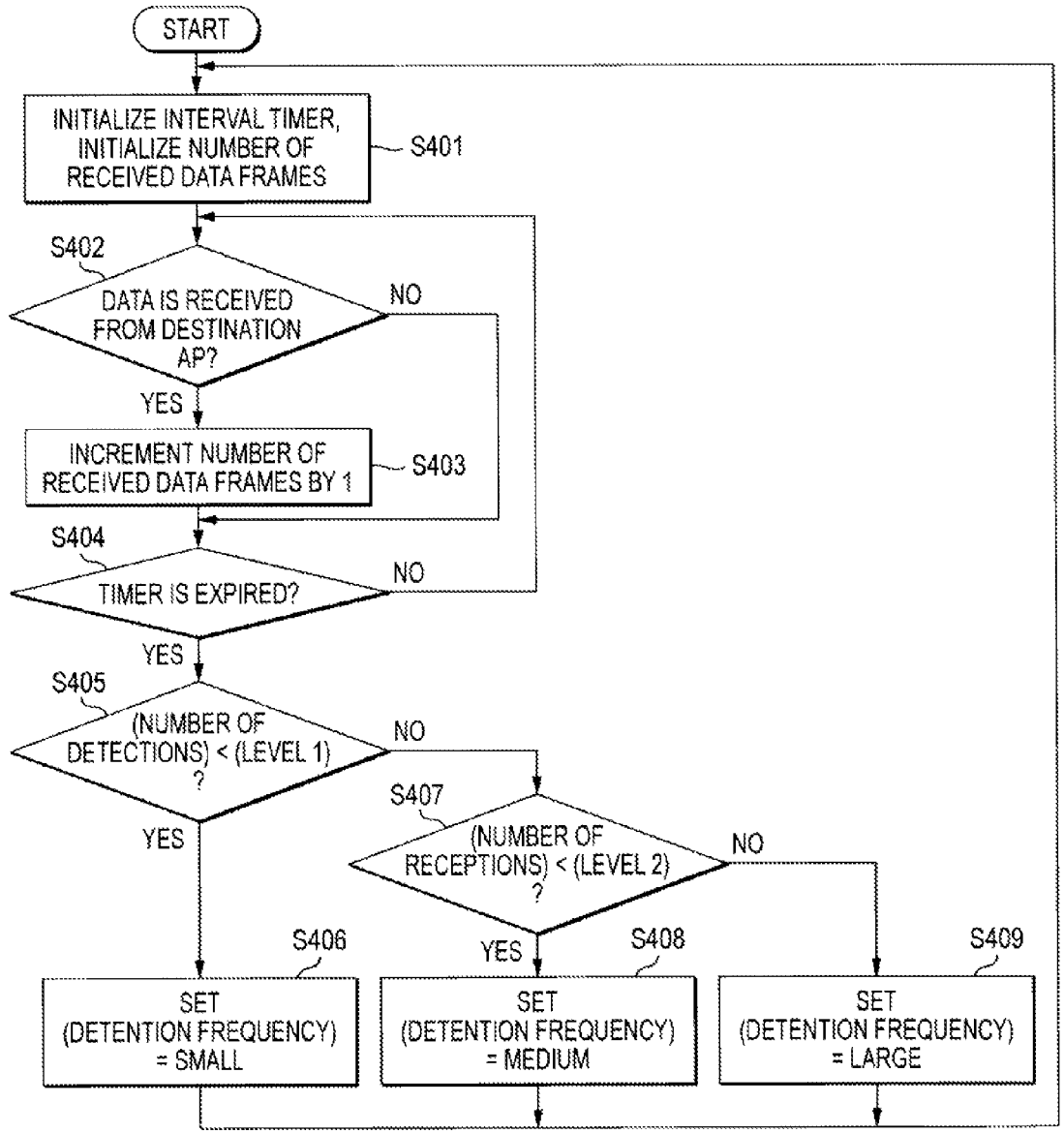
FIG. 4 is a flowchart for calculating detention estimate information according to the first embodiment.

FIG. 4 is a flowchart for calculating the detention estimate information by the transmission standby frequency estimation unit 103 in the communication terminal according to the first embodiment.

The transmission standby frequency estimation unit 103 first initializes a timer and a counter in the detention estimate information calculating process (Step S401). Specifically, the transmission standby frequency estimation unit 103 initializes the interval timer 201 used for measuring the detention frequency, and the received data frame number counter 202 for managing the number of data frames received during the operation of an interval timer.

Then, the transmission standby frequency estimation unit 103 determines whether data has been received from the destination access point (AP) (wireless LAN access point in this example) connected with the subject communication terminal, or not (Step S402). If the determination in Step S402 is yes, that is, if data is received from the destination access point, the transmission standby frequency estimation unit 103 increments the received data frame number counter 202 by 1 (Step S403). Also, the transmission standby frequency estimation unit 103 determines whether the interval timer 201 has expired, or not (Step S404).

An expiration of the interval timer 201 is, for example, 100 ms, and this value is variable. If the determination in Step S402 is no, that is, if data is not received from the destination access point, the processing is advanced to step S404 as it is. If the interval timer 201 does not expire (no in the determination of Step S404), the processing is returned to Step S402. It is determined whether data has been received from the destination access point, or not.

If the interval timer 201 expires (yes in the determination of Step S404), the transmission standby frequency estimation unit 103 determines whether the count value of the received data frame number counter 202 is lower than the level 1, or not (Step S405). If the determination in Step S405 is yes, that is, the counter value of the received data frame number counter 202 is lower than the level 1, the processing is advanced to Step S406. the detention estimate information calculation unit 204 sets the detention frequency to "small", and notifies the TCP-ACK generation control unit 106 of the set detention frequency as the detention frequency information (Step S406), and returns to Step S401.

Also, if the determination in Step S405 is no, that is, if the counter value of the received data frame number counter 202 is the level 1 or higher, the processing is advanced to Step S407. The detention estimate information calculation unit 204 determines whether the counter value of the received data frame number counter 202 is lower than the level 2, or not (Step S407). If the determination of Step S407 is yes, that is, the counter value of the received data frame number counter 202 is lower than the level 2, the processing is advanced to Step S408. The detention estimate information calculation unit 204 sets the detention frequency to "medium", and notifies the TCP-ACK generation control unit 106 of the set detention frequency as the detention frequency information (Step S408), and returns to Step S401.

Also, if the determination of Step S407 is no, that is, the counter value of the received data frame number counter is the level 2 or higher, the processing is advanced to Step S409. The detention estimate information calculation unit 204 sets the detention frequency to "large", and notifies the TCP-ACK generation control unit 106 of the set detention frequency as the detention frequency information (Step S409), and returns to Step S401.

Figure 5:
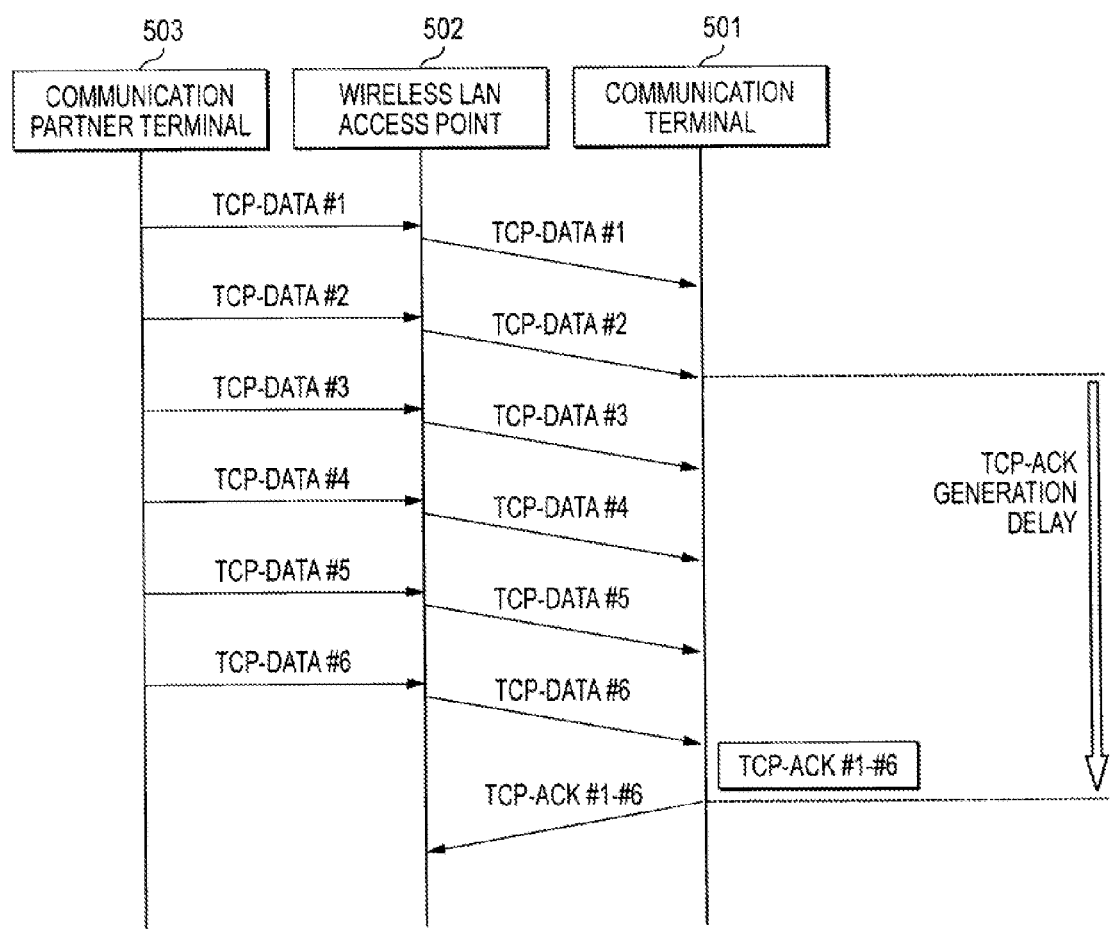
FIG. 5 is a sequence diagram illustrating an example of data transfer operation between a transmitter terminal and a receiver terminal according to the first embodiment.

FIG. 5 is a sequence diagram illustrating an example of data transfer operation between the transmitter terminal and the receiver terminal according to the first embodiment. FIG. 5 illustrates a case in which the detention frequency is large, and the TCP-ACK generation frequency is set to three times as large as the normal. In the example shown, the TCP segment data is transmitted in a bursty manner from a communication partner terminal 503, which is the transmitter terminal, to a communication terminal (wireless LAN terminal) 501, which is the receiver terminal, through a wireless LAN access point 502.

In this case, the wireless LAN terminal 501 is large in the number of received data frames in the given interval, high in the detention frequency, and delays the transmission of the TCP-ACK at the normal TCP-ACK generation frequency. For that reason, the communication terminal 501 sets the TCP-ACK generation frequency to three times as large as the default value, and generates one TCP-ACK #1 to #6 at the time of receiving TCP-DATA #1 to TCP-DATA As a result, the communication terminal 501 delays the generation timing of the TCP-ACK. Then, the communication terminal 501 returns the TCP-ACK #1 to #6 to the wireless LAN access point 502 after acquiring the transmission right.

With the above-mentioned processing according to this embodiment, the traffic of the communication line can be estimated according to the number of received data in a predetermined period to estimate the detention frequency of transmission data. In this situation, under circumstances where the transmission standby of the TCP-ACK is liable to occur, that is, in a situation where the detention frequency of the transmission data is high, thereby making it difficult to obtain the transmission right immediately, the generation frequency is so adjusted as to delay the generation timing of the TCP-ACK. That is, in this embodiment, the TCP-ACK is generated after receiving more pieces of TCP segment data.

With this adjustment of the TCP-ACK generation timing, one TCP-ACK can notify the transmitter side of the reception acknowledgement of more pieces of TCP segment data. As a result, because the number of TCP-ACK transmissions can be reduced, the power consumption of the communication terminal can be reduced. Also, because the number of data frames to be transmitted to the communication media can be reduced by reducing the number of TCP-ACK transmissions, the throughput of the system can be improved.

Therefore, according to this embodiment, the generation timing of the TCP-ACK is controlled according to the use condition of the transmission path whereby the divided transmission of the TCP-ACK can be suppressed, and the acknowledgement can be efficiently conducted.

The number of detention frequency levels and the boundary value of the detention frequency levels in the above-mentioned embodiment can be changed. In this embodiment, the number of levels is set to three, and the boundary value between the level 1 and the level 2 is set to twice of the normal TCP-ACK generation frequency, that is, four in the number of received data frames. The boundary value between the level 2 and the level 3 is set to three times of the normal TCP-ACK generation frequency, that is, six in the number of received data frames. However, the present invention is not limited to this configuration. For example, the number of levels may be set to two, four, or more, and the respective boundary values may be set to different values.

Also, the TCP parameters such as the ACK parameters which change according to the detention frequency levels are described above as one example. Even if the TCP parameters are changed to not twice and three times, but an increment of two and an increment of three, the same advantages are obtained.

Second Embodiment

Figure 6:
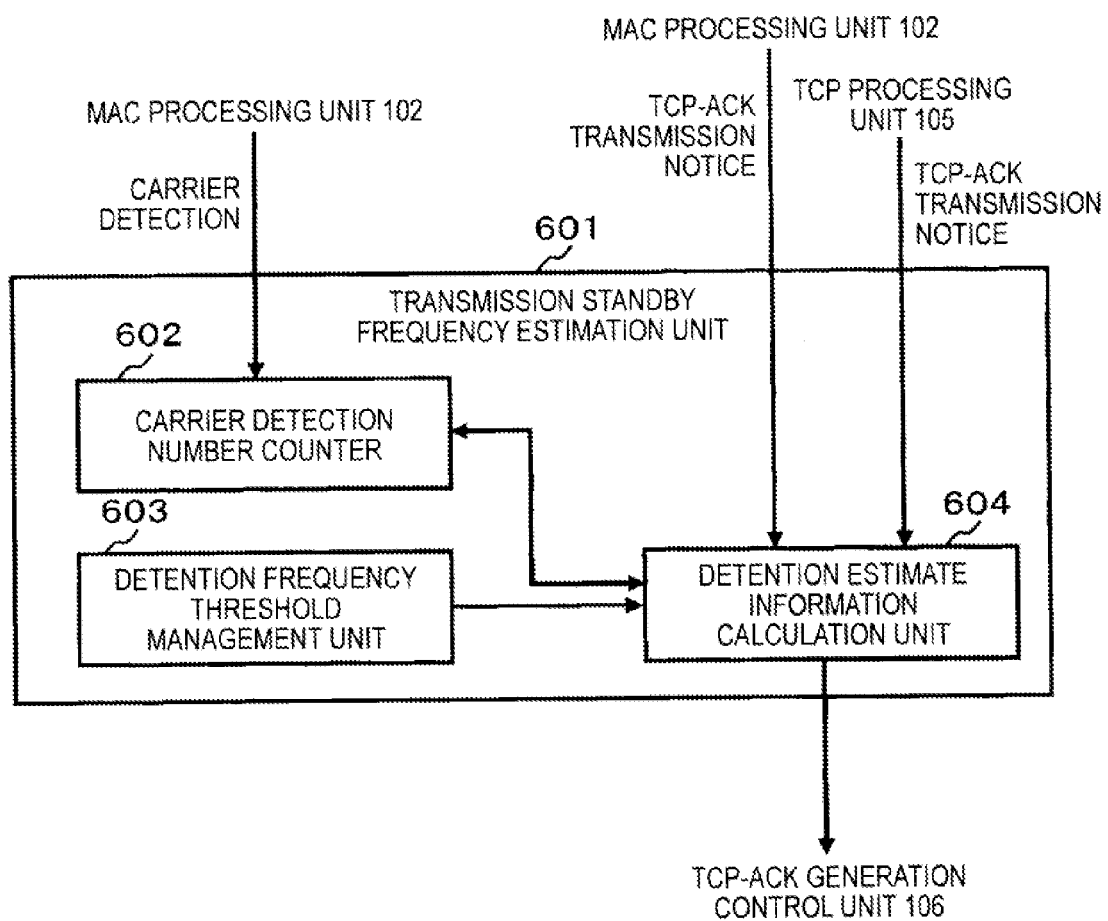
FIG. 6 is a block diagram illustrating a configuration of a transmission standby frequency estimation unit according to a second embodiment.
Figure 7:
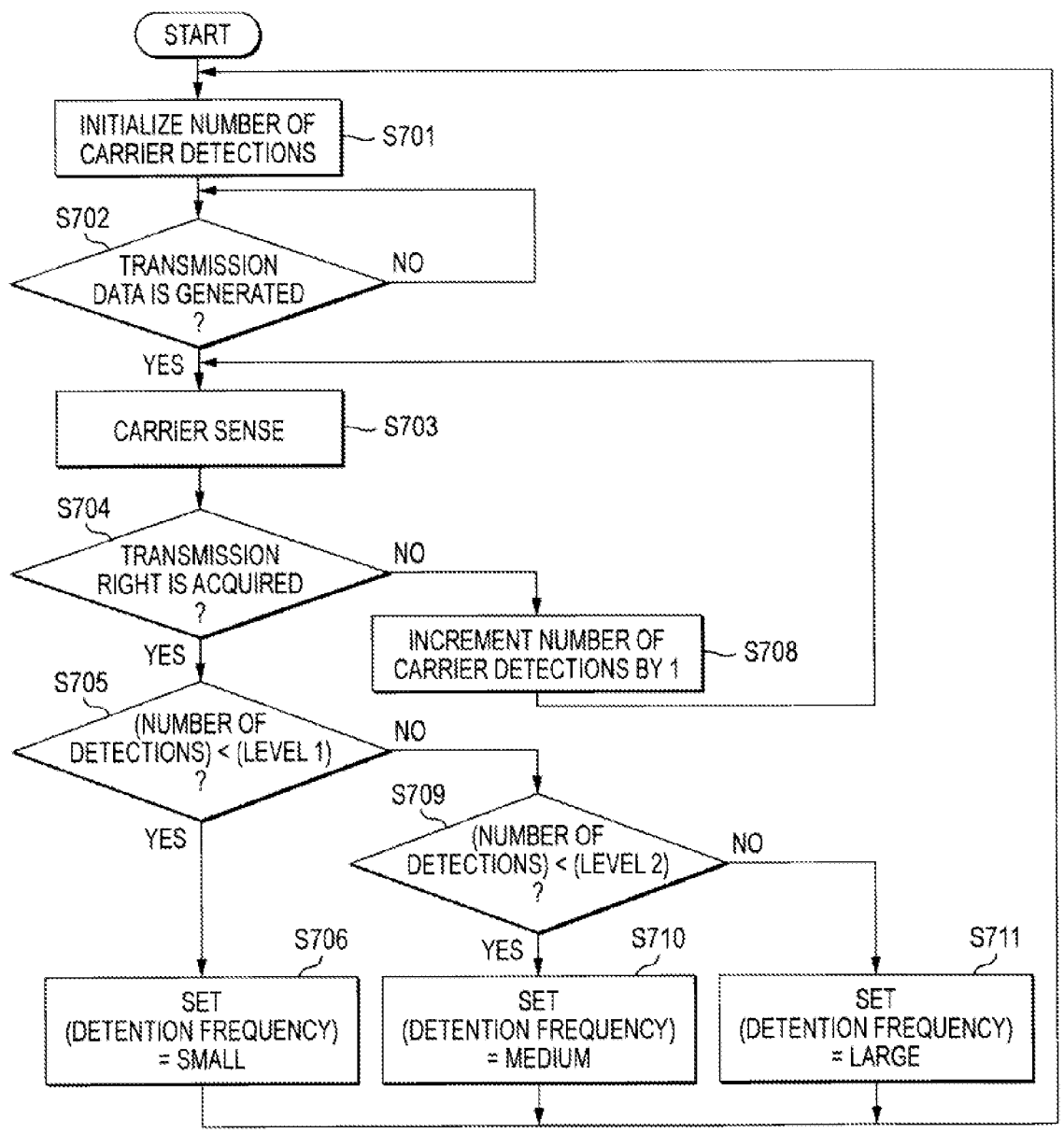
FIG. 7 is a flowchart for calculating detention estimate information according to the second embodiment.

FIGS. 6 and 7 illustrate an example of a communication terminal and a communication method according to a second embodiment. In the second embodiment, a basic configuration of the communication terminal is identical with the configuration in the first embodiment illustrated in FIG. 1, and the transmission standby frequency estimation unit 103 is replaced with a transmission standby frequency estimation unit 601 different in configuration and function therefrom. The same components as those in the first embodiment are denoted by identical symbols, their description will be omitted, and only different portions will be described.

When the MAC processing unit 102 implements carrier sense, and detects a carrier from another communication terminal while attempting to acquire the transmission right of the data frame, and acquires the transmission right to complete the transmission, the MAC processing unit 102 notifies the transmission standby frequency estimation unit 601 of this fact.

The transmission standby frequency estimation unit 601 calculates the detention estimate information indicating how long the transmission of an IP packet storing the TCP-ACK acquired from the IP processing unit 104 by the MAC processing unit 102 is retained, and notifies the TCP-ACK generation control unit 106 of the calculated detention estimate information.

FIG. 6 is a block diagram illustrating a configuration of the transmission standby frequency estimation unit 601 according to the second embodiment. The transmission standby frequency estimation unit 601 includes a carrier detection number counter 602, a detention frequency threshold management unit 603, and a detention estimate information calculation unit 604.

The carrier detection number counter 602 counts the number of transmission detections (transmission signal or interference wave) from another communication terminal during the carrier sense, that is, counts the number of carrier detections. The start of counting the number of carrier detections and the initialization of the counter value are implemented according to an instruction from the detention estimate information calculation unit 604.

The carrier detection number counter 602 realizes the function of a transmission detection number recording unit that records the number of detecting the transmissions from another terminal since the transmission data is generated until the transmission data is transmitted to the communication media.

The detention frequency threshold management unit 603 manages a threshold value for defining the levels of the detention frequency according to counter values of the carrier detection number counter 602. For example, the detention frequency threshold management unit 603 defines the detention frequency to three levels consisting of level 1 (small), level 2 (medium), and level 3 (large). The detention frequency threshold management unit 203 sets a boundary value between the level 1 and the level 2 to five in the number of carrier detections, and sets a boundary value between the level 2 and the level 3 to ten in the number of carrier detections.

Upon receiving a notice that the TCP-ACK is sent to the IP processing unit 104, from the TCP processing unit 105, the detention estimate information calculation unit 604 instructs the carrier detection number counter 602 to start to count the number of carrier detections. Also, upon receiving a transmission completion notice of the data frame including the TCP-ACK from the MAC processing unit 102, the detention estimate information calculation unit 604 refers to the counter value of the carrier detection number counter 602 and the threshold value information of the detention frequency threshold management unit 603.

As a result of referring to those information, the detention estimate information calculation unit 604 determines to which detention frequency level the received data frame number counter value belongs. Further, the detention estimate information calculation unit 604 notifies the TCP-ACK generation control unit 106 of the determination result, and instructs the carrier detection number counter 602 to initialize the counter value.

As described above, the transmission standby frequency estimation unit 601 according to this embodiment counts the number of carrier detections since the TCP-ACK is generated in the TCP processing unit 105 until the transmission of the TCP-ACK is completed by the MAC processing unit 102. Further, the transmission standby frequency estimation unit 601 determines the detention frequency level on the basis of the number of carrier detections in this period. The transmission standby frequency estimation unit 601 notifies the TCP-ACK generation control unit 106 of the detention frequency level as the detention estimate information.

The TCP processing unit 105 has a function of notifying the transmission standby frequency estimation unit 601 that processing of transferring the TCP-ACK to the IP processing unit 104 is implemented. Also, the TCP processing unit 105 changes, on the basis of a notice from the TCP-ACK generation control unit 106, an ACK parameter for managing how many TCP segment data should be normally received from the IP layer in order to generate the TCP-ACK.

The TCP processing unit 105 sets the generation timing of the TCP-ACK in a ordinary state to a timing after receiving two segments, four segments, or six segments of the TCP segment data, according to the change in the ACK parameter. In general, the TCP-ACK is generated after one segment is received in a congestion state, and the TCP-ACK is generated after two segments are received in the ordinary state.

The TCP-ACK generation control unit 106 instructs the TCP processing unit 105 to change the ACK parameter for managing the generation frequency of the TCP-ACK on the basis the detention estimate information received from the transmission standby frequency estimation unit 601. The detention estimate information represents the size of the received data frame number while attempting to acquire the transmission right, between the generation of the TCP-ACK and the completion of transmission, by a plurality of levels as described above. That is, the detention estimate information is indicative of how many carriers have been received from another communication terminal while waiting for transmission of the TCP-ACK.

That is, when the TCP-ACK is generated after two segments of the TCP segment data are received at a normal generation frequency, the detention estimate information corresponds to information indicative of a degree (detention frequency) of how long the TCP-ACK is retained since the TCP-ACK is generated until the TCP-ACK can be transmitted. Thus, the ACK parameter is changed on the basis of the detention estimate information to adjust the generation frequency of the TCP-ACK whereby the generation timing of the TCP-ACK can be controlled to enable the TCP-ACK to be generated and transmitted according to the use condition of the transmission path.

FIG. 7 is a flowchart for calculating the detention estimate information in the communication terminal according to the second embodiment.

In the detention estimate information calculating process by the transmission standby frequency estimation unit 601, the carrier detection number counter 602 that manages the number of carrier detections during attempting to acquire the transmission right of data, which is used for measuring the detention frequency, is first initialized (Step S701).

Then, the transmission standby frequency estimation unit 601 determines whether the TCP-ACK data to be transmitted by the subject communication terminal has been generated, or not (Step S702). If the determination in Step S702 is no, that is, if no transmission data is generated, the transmission standby frequency estimation unit 601 repeats the determination of Step S702 until the transmission data is generated.

If the transmission data is generated (yes in the determination of Step S702), the MAC processing unit 102 implements the carrier sense for acquiring the transmission right of data (Step S703). Then, the MAC processing unit 102 determines whether the transmission right could be acquired, or not, according to whether the carrier from another communication terminal has been detected, or not, on the basis of the result of the carrier sense (Step S704).

As a result of the carrier sense, if the transmission right has not yet been acquired (no in the determination of Step S704), that is, if the carrier has been detected from another communication terminal, the MAC processing unit 102 increments the carrier detection number counter 602 by 1 (Step S708). Further, the MAC processing unit 102 again returns to the carrier sense process (Step S703) for acquiring the transmission right.

As a result of the carrier sense, if the transmission right has been acquired (yes in the determination of Step S704), the transmission standby frequency estimation unit 601 determines whether the counter value of the carrier detection number counter 602 is lower than the level 1, or not (Step S705). If the determination in Step S705 is yes, that is, if the counter value of the carrier detection number counter 602 is lower than the level 1, the processing is advanced to Step S706. The detention estimate information calculation unit 604 sets the detention frequency to "small", and notifies the TCP-ACK generation control unit 106 of the set detention frequency as the detention frequency information (Step S706), returns to Step S701, and initializes the carrier detection number counter 602.

Also, if the determination in Step S705 is no, that is, if the counter value of the carrier detection number counter 602 is the level 1 or higher, the transmission standby frequency estimation unit 601 determines whether the counter value of the carrier detection number counter 602 is lower than the level 2, or not (Step S709). If the determination in Step S709 is yes, that is, if the counter value of the carrier detection number counter 602 is lower than the level 2, the processing is advanced to Step S710. The detention estimate information calculation unit 604 sets the detention frequency to "medium", and notifies the TCP-ACK generation control unit 106 of the set detention frequency as the detention frequency information (Step S710), returns to Step S701, and initializes the carrier detection number counter 602.

Also, if the determination in Step S709 is no, that is, if the counter value of the carrier detection number counter 602 is the level 2 or higher, the processing is advanced to Step S711. The detention estimate information calculation unit 604 sets the detention frequency to "large", and notifies the TCP-ACK generation control unit 106 of the set detention frequency as the detention frequency information (Step S711), returns to Step S701, and initializes the carrier detection number counter 602.

With the above-mentioned processing according to this embodiment, the traffic of the communication line can be estimated according to the number of detecting the transmission from another communication terminal to estimate the detention frequency of transmission data. In this situation, under circumstances where the transmission standby of the TCP-ACK is liable to occur due to the other terminal, that is, in a situation where the detention frequency of the transmission data is high, thereby making it difficult to obtain the transmission right immediately, the generation frequency of the TCP-ACK is adjusted. More specifically, in this embodiment, the generation timing of the TCP-ACK is delayed, and the generation frequency is adjusted so that the TCP-ACK is generated after receiving more pieces of TCP segment data.

With this adjustment of the TCP-ACK generation timing, one TCP-ACK can notify the transmitter side of the reception acknowledgement of more pieces of TCP segment data. As a result, because the number of TCP-ACK transmissions can be reduced as in the first embodiment, the power consumption of the communication terminal can be reduced. Also, in this embodiment, because the number of data frames to be transmitted to the communication media can be reduced by reducing the number of TCP-ACK transmissions, the throughput of the system can be improved.

The number of detention frequency levels and the boundary value of the detention frequency levels in the above-mentioned embodiment can be changed. In this embodiment, the number of levels is set to three, the boundary value between the level 1 and the level 2 is set to five in the number of carrier detections, and the boundary value between the level 2 and the level 3 is set to ten in the number of carrier detections. However, the present invention is not limited to this configuration. For example, the number of levels may be set to two, four, or more, and the respective boundary values may be set to different values.

Also, the TCP parameters such as the ACK parameters which change according to the detention frequency levels are described above as one example. Even if the TCP parameters are changed to not twice and three times, but an increment of two and an increment of three, the same advantages are obtained.

The transmission standby frequency estimation unit 601 may notify the TCP-ACK generation control unit 106 of the TCP-ACK generation prohibition in the TCP processing unit 105 in a specific period.

This can be realized by setting the boundary value between the level 2 and the level 3 so that the detention frequency becomes always the level 3 during the operation of the carrier detection number counter 602. In this case, in the level 3, the TCP-ACK generation timer timeout value is set to an RU threshold value, and the TCP-ACK generation frequency is set to infinity.

Third Embodiment

Figure 8:
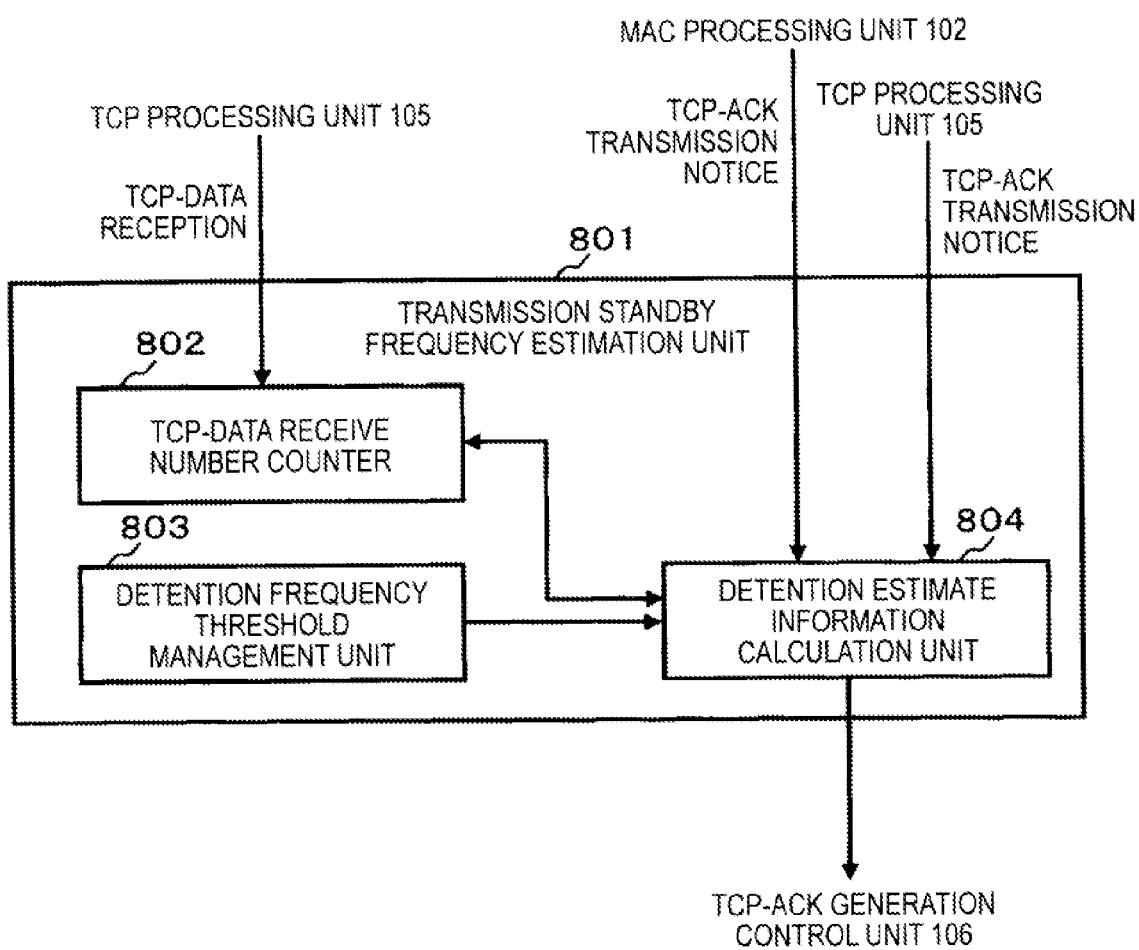
FIG. 8 is a block diagram illustrating a configuration of a transmission standby frequency estimation unit according to a third embodiment.
Figure 9:
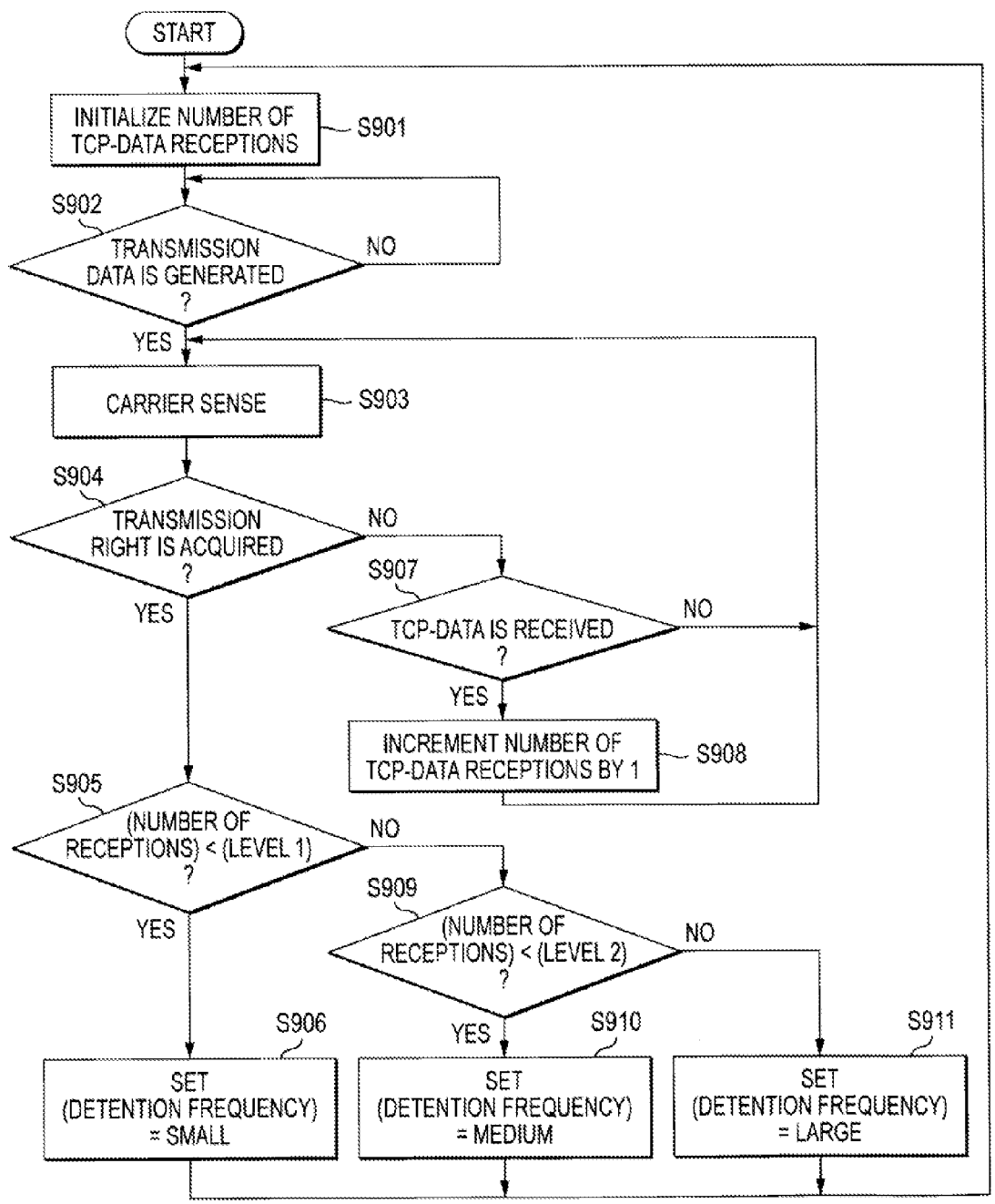
FIG. 9 is a flowchart for calculating detention estimate information according to the third embodiment.

FIGS. 8 and 9 are block diagrams illustrating a communication terminal and a communication method according to a third embodiment of the present invention. In the third embodiment, a basic configuration of the communication terminal is identical with the configuration in the first embodiment illustrated in FIG. 1, and the transmission standby frequency estimation unit 103 is replaced with a transmission standby frequency estimation unit 801 different in configuration and function therefrom. The same components as those in the first embodiment are denoted by identical symbols, their description will be omitted, and only different portions will be described.

When the MAC processing unit 102 according to the third embodiment discriminates whether the transmission standby data frame is data including the TCP-ACK, or not. If the MAC processing unit 102 acquires the transmission right of the data frame including the TCP-ACK and completes the transmission, the MAC processing unit 102 notifies the transmission standby frequency estimation unit 801 of this fact. The data frame determination function can determines whether the data frame includes the TCP-ACK, or not, according to the header information of the transmission data by managing the offset of an IP header and a TCP header in the MAC processing unit 102.

The transmission standby frequency estimation unit 801 calculates the detention estimate information indicating how long the transmission of an IP packet storing the TCP-ACK acquired from the IP processing unit 104 by the MAC processing unit 102 is retained, and notifies the TCP-ACK generation control unit 106 of the calculated detention estimate information.

FIG. 8 is a block diagram illustrating a configuration of the transmission standby frequency estimation unit 801 according to the third embodiment. The transmission standby frequency estimation unit 801 includes a TCP-DATA receive number counter 802, a detention frequency threshold management unit 803, and a detention estimate information calculation unit 804.

The TCP-DATA receive number counter 802 counts the number of TCP-DATA (the number of TCP segment data) newly received during waiting for the transmission of the TCP-ACK, that is, the number of receiving data related to the session. The start of counting the number of the TCP-ACK receptions, and the initialization of the counter value are implemented according to an instruction of the detention estimate information calculation Unit 804.

The TCP-DATA receive number counter 802 realizes the function of a TCP data receive number recording unit that records the number of receiving the TCP data from the source terminal of the TCP acknowledgement segment in a specific interval. The specific interval is an interval since the TCP acknowledgement segment is generated until the TCP acknowledgement segment is transmitted to the communication media.

The detention frequency threshold management unit 803 manages a threshold value for defining the levels of the detention frequency according to counter values of the TCP-DATA receive number counter 802. For example, the detention frequency threshold management unit 803 defines the detention frequency to three levels consisting of level 1 (small), level 2 (medium), and level 3 (large). The detention frequency threshold management unit 803 sets a boundary value between the level 1 and the level 2 to twice of the TCP-ACK generation frequency in the normal state, that is, four in the number of TCP-DATA receptions. Also, the detention frequency threshold management unit 803 sets a boundary value between the level 2 and the level 3 to three times of the TCP-ACK generation frequency in the normal state, that is, six in the number of TCP-DATA receptions.

Upon receiving a notice that the TCP-ACK is sent to the IP processing unit 104, from the TCP processing unit 105, the detention estimate information calculation unit 804 instructs the TCP-DATA receive number counter 802 to start to count the number of TCP-DATA receptions. Also, upon receiving a transmission completion notice of the data frame including the TCP-ACK from the MAC processing unit 102, the detention estimate information calculation unit 804 refers to the counter value of the TCP-DATA receive number counter 802 and the threshold value information of the detention frequency threshold management unit 803.

As a result of referring to those information, the detention estimate information calculation unit 804 determines to which detention frequency level the received TCP-DATA number counter value belongs, notifies the TCP-ACK generation control unit 106 of the determination result, and instructs the TCP-DATA receive number counter 802 to initialize the counter.

As described above, the transmission standby frequency estimation unit 801 according to this embodiment counts the number of TCP-DATA receptions in the specific interval, and determines the detention frequency level on the basis of the number of TCP-DATA in this period. The specific interval is an interval since the TCP-ACK is generated in the TCP processing unit 105 until the transmission of the TCP-ACK is completed by the MAC processing unit 102. The transmission standby frequency estimation unit 801 notifies the TCP-ACK generation control unit 106 of the detention frequency level as the detention estimate information.

The TCP processing unit 105 has a function of notifying the transmission standby frequency estimation unit 801 that processing of transferring the TCP-ACK to the IP processing unit 104 is implemented. Further, when the TCP processing unit 105 receives the TCP-DATA, the TCP processing unit 105 has a function of notifying the transmission standby frequency estimation unit 801 of this fact. Also, the TCP processing unit 105 changes, on the basis of a notice from the TCP-ACK generation control unit 106, an ACK parameter for managing how many TCP segment data should be normally received from the IP layer in order to generate the TCP-ACK.

The TCP processing unit 105 sets the generation timing of the TCP-ACK in a ordinary state to a timing after receiving two segments, four segments, or six segments of the TCP segment data, according to the change in the ACK parameter. In general, the TCP-ACK is generated after one segment is received in a congestion state, and the TCP-ACK is generated after two segments are received in the ordinary state.

The TCP-ACK generation control unit 106 instructs the TCP processing unit 105 to change the ACK parameter for managing the generation frequency of the TCP-ACK on the basis the detention estimate information received from the transmission standby frequency estimation unit 801. The detention estimate information represents the size of the received TCP segment data number during attempting to acquire the transmission right, between the generation of the TCP-ACK and the completion of transmission, by a plurality of levels as described above. That is, the detention estimate information is indicative of how many TCP segment data related to a session received by the subject communication terminal have been received during waiting for transmission of the TCP-ACK.

That is, when the TCP-ACK is generated after two segments of the TCP segment data are received at a normal generation frequency, the detention estimate information corresponds to information indicative of a degree (detention frequency) of how long the TCP-ACK is retained since the TCP-ACK is generated until the TCP-ACK can be transmitted. Thus, the ACK parameter is changed on the basis of the detention estimate information to adjust the generation frequency of the TCP-ACK whereby the generation timing of the TCP-ACK can be controlled to enable the TCP-ACK to be generated and transmitted according to the use condition of the transmission path.

FIG. 9 is a flowchart for calculating the detention estimate information by the transmission standby frequency estimation unit 801 in the communication terminal according to the third embodiment.

In the detention estimate information calculating process by the transmission standby frequency estimation unit 801, a counter used for measuring the detention frequency is first initialized (Step S901). More specifically, the transmission standby frequency estimation unit 801 initializes the TCP-DATA receive number counter 802 that manages the number of TCP-DATA receptions while attempting to acquire the transmission right of the TCP-ACK.

Then, the transmission standby frequency estimation unit 801 determines whether the TCP-ACK data to be transmitted by the subject communication terminal has been generated, or not (Step S902). If the determination in Step S902 is no, that is, if no transmission data is generated, the transmission standby frequency estimation unit 801 repeats the determination of Step S902 until the transmission data is generated.

If the transmission data is generated (yes in the determination of Step S902), the MAC processing unit 102 implements the carrier sense for acquiring the transmission right of data (Step S903). Then, the MAC processing unit 102 determines whether the transmission right could be acquired, or not, according to whether the carrier from another communication terminal has been detected, or not (Step S904).

As a result of the carrier sense, if the transmission right has not yet been acquired (no in the determination of Step S904), that is, if the carrier has been detected from another communication terminal, the processing is advanced to Step S907. The MAC processing unit 102 determines whether the TCP-DATA from the communication partner terminal has been received, or not (Step S907). If the determination in Step S907 is yes, that is, if the TCP-DATA from the communication partner terminal has been detected, the MAC processing unit 102 increments the TCP-DATA receive number counter 802 by 1 (Step S908). Further, the MAC processing unit 102 again returns to the carrier sense process for acquiring the transmission right (Step S903).

Also, if the determination in Step S907 is no, that is, if the TCP-DATA from the communication partner terminal has not been detected, the MAC processing unit 102 returns to the carrier sense process (Step S903) for acquiring the transmission right as it is. That is, the MAC processing unit 102 implements the carrier sense process until the transmission right can be acquired.

As a result of the carrier sense, if the transmission right has been acquired (yes in the determination of Step S904), the transmission standby frequency estimation unit 801 determines whether the counter value of the TCP-DATA receive number counter 802 is lower than the level 1, or not (Step S905).

If the determination in Step S905 is yes, that is, if the counter value of the TCP-DATA receive number counter 802 is lower than the level 1, the processing is advanced to Step S906. The detention estimate information calculation unit 804 sets the detention frequency to "small", and notifies the TCP-ACK generation control unit 106 of the set detention frequency as the detention frequency information (Step S906), returns to Step S901, and initializes the TCP-DATA receive number counter 802.

Also, if the determination in Step S905 is no, the counter value of the TCP-DATA receive number counter 802 is the level 1 or higher, and the transmission standby frequency estimation unit 801 determines whether the counter value is lower than the level 2, or not (Step S909). If the determination in Step S909 is yes, that is, if the counter value of the TCP-DATA receive number counter 802 is lower than the level 2, the processing is advanced to Step S910. The detention estimate information calculation unit 804 sets the detention frequency to "medium", and notifies the TCP-ACK generation control unit 106 of the set detention frequency as the detention frequency information (Step S910), returns to Step S901, and initializes the TCP-DATA receive number counter 802.

Also, if the determination in Step S909 is no, that is, if the counter value of the TCP-DATA receive number counter 802 is the level 2 or higher, the processing is advanced to Step S911. The detention estimate information calculation unit 804 sets the detention frequency to "large", and notifies the TCP-ACK generation control unit 106 of the set detention frequency as the detention frequency information (Step S911), returns to Step S901, and initializes the TCP-DATA receive number counter 802.

As described above, according to this embodiment, the traffic of the communication line and the burst property of data arriving from the communication partner can be estimated according to the number of receiving the TCP-DATA from a new source terminal while waiting for the transmission data including the TCP-ACK from the subject terminal to estimate the detention frequency of the transmission data.

In this situation, under circumstances where the transmission standby of the TCP-ACK is liable to occur due to the transmission of the other terminal, that is, in a situation where the detention frequency of the transmission data is high, thereby making it difficult to obtain the transmission right immediately, the generation frequency of the TCP-ACK is adjusted. More specifically, in this embodiment, the generation timing of the TCP-ACK is delayed, and the generation frequency is adjusted so that the TCP-ACK is generated after receiving more pieces of TCP segment data. With this adjustment of the TCP-ACK generation timing, one TCP-ACK can notify the transmitter side of the reception acknowledgement of more pieces of TCP segment data.

As a result, because the number of TCP-ACK transmissions can be reduced as in the first and second embodiments, the power consumption of the communication terminal can be reduced. Also, because the number of data frames to be transmitted to the communication media can be reduced by reducing the number of TCP-ACK transmissions, the throughput of the system can be improved.

The number of detention frequency levels and the boundary value of the detention frequency levels in the above-mentioned embodiment can be changed. In this embodiment, the number of levels is set to three, the boundary value between the level 1 and the level 2 is set to twice of the normal TCP-ACK generation frequency, that is, four in the number of TCP-DATA receptions. The boundary value between the level 2 and the level 3 is set to twice of the normal TCP-ACK generation frequency, that is, six in the number of TCP-DATA receptions. However, the present invention is not limited to this configuration. For example, the number of levels may be set to two, four, or more, and the respective boundary values may be set to different values.

Also, the TCP parameters such as the ACK parameters which change according to the detention frequency levels are described above as one example. Even if the TCP parameters are changed to not twice and three times, but an increment of two and an increment of three, the same advantages are obtained.

The transmission standby frequency estimation unit 801 may notify the TCP-ACK generation control unit 106 of the TCP-ACK generation prohibition in the TCP processing unit 105 in a specific period. The specific period is a period since the notice that the TCP-ACK is transmitted to the IP processing unit 104 is received from the TCP processing unit 105 until the notice that the transmission right of the TCP-ACK is acquired, and the transmission is completed is received from the MAC processing unit 102.

This can be realized by setting the boundary value between the level 2 and the level 3 so that the detention frequency becomes always the level 3 during the operation of the TCP-DATA receive number counter 802. In this case, in the level 3, the TCP-ACK generation timer timeout value is set to an RTT threshold value, and the TCP-ACK generation frequency is set to infinity.

Fourth Embodiment

Figure 10:
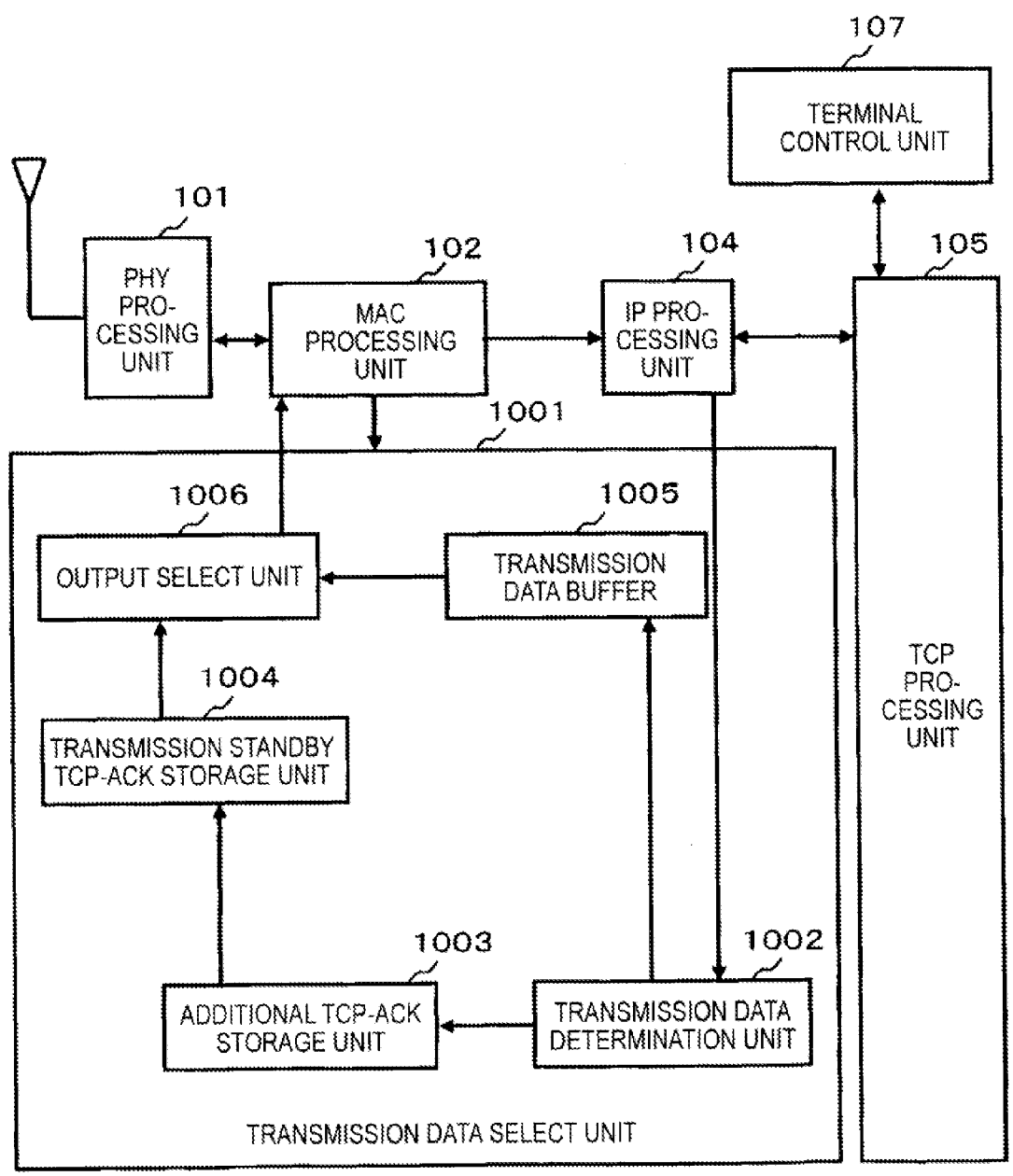
FIG. 10 is a block diagram illustrating a configuration of a communication terminal according to a fourth embodiment.

FIGS. 10 to 13 illustrate an example of a communication terminal and a communication method according to a fourth embodiment of the present invention. FIG. 10 is a block diagram illustrating a configuration of a communication terminal according to the fourth embodiment. The same components as those in the first embodiment are denoted by identical symbols, their description will be omitted, and only different portions will be described.

The MAC processing unit 102 conducts access control processing to a communication media. Also, the MAC processing unit 102 conducts the MAC layer processing of a receive frame received from the PHY processing unit 101, and delivers the processed receive frame to the IP processing unit 104. Also, the MAC processing unit 102 conducts the MAC layer processing on the transmission data frame received from a transmission data select unit 1001, and delivers the processed transmission data frame to the PHY processing unit 101. Also, the MAC processing unit 102 also has a function of notifying, if the transmission right has been acquired as a result of the carrier sense, the transmission data select unit 1001 of this fact.

The IP processing unit 104 analyzes a header of an IP packet received from the MAC processing unit 102, and delivers a payload of the IP packet to a higher layer processing unit such as the TCP processing unit 105. Also, the IP processing unit 104 allocates an IP header to the TCP segment data received from the TCP processing unit 105, and delivers the data to the transmission data select unit 1001.

The transmission data select unit 1001 analyzes the IP packet received from the IP processing unit 104, and analyzes whether data to be transmitted is a TCP-ACK for the TCP-DATA reception, or not. If the data is the TCP-ACK, the transmission data select unit 1001 updates the TCP-ACK received from the IP processing unit 104 until the transmission right is really acquired, and delivers the updated TCP-ACK to the MAC processing unit 102. Also, if there is a transmission standby data, the transmission data select unit 1001 sends a transmission standby notice to the MAC processing unit 102 so as to attempt data transmission right acquisition.

The transmission data select unit 1001 includes a transmission data determination unit 1002, an additional TCP-ACK storage unit 1003, a transmission standby TCP-ACK storage unit 1004, a transmission data buffer 1005, and an output select unit 1006.

The transmission data determination unit 1002 analyzes the IP packet received from the IP processing unit 104, and determines whether stored data is the TCP-ACK, or not. In this situation, the transmission data determination unit 1002 discriminates whether a payload of the IP packet is a TCP, or not, according to IP header information of the IP packet. Further, if the payload is the TCP, the transmission data determination unit 1002 analyzes TCP header information, and discriminates whether the TCP header information is the TCP-ACK, or not. If the TCP header information is the TCP-ACK, the transmission data determination unit 1002 delivers the TCP-ACK data to the additional TCP-ACK storage unit 1003.

Also, if the TCP header information is not the TCP-ACK, the transmission data determination unit 1002 delivers the transmission data to the transmission data buffer 1005. Also, the transmission data determination unit 1002 manages arrival order information on the transmission data, and if the transmission data determination unit 1002 transfers the transmission data to the additional TCP-ACK storage unit 1003 and the transmission data buffer 1005, the transmission data determination unit 1002 transfers the transmission data together with the arrival order information indicative of the data arrival order. The arrival order information is time information managed by the system.

Upon newly receiving the TCP-ACK data from the transmission data determination unit 1002, the additional TCP-ACK storage unit 1003 notifies the transmission standby TCP-ACK storage unit 1004 of the arrival of data and the destination of data.

The transmission standby TCP-ACK storage unit 1004 stores data in a buffer so as to sequentially deliver the TCP-ACK data from the additional TCP-ACK storage unit 1003 to the output select unit 1006. The data output order follows a queueing algorithm. As the data output order, in this example, data is sequentially output in order of arrival. As another example, priority may be allocated to data so that data is output in order of priority. In order to process data in order of priority, the buffer may be provided for each of priority classes, separately. A case in which data is output in order of arrival is equivalent to that the buffer is provided for one class.

Also, upon receiving a new data arrival notice from the additional TCP-ACK storage unit 1003, the transmission standby TCP-ACK storage unit 1004 searches whether the TCP-ACK data for an appropriate destination has already been stored therein, or not. In this case, if the TCP-ACK data for the appropriate destination has already been stored therein, the transmission standby TCP-ACK storage unit 1004 replaces the TCP-ACK for the appropriate destination with the new TCP-ACK data stored in the additional TCP-ACK storage unit 1003.

In this situation, the arrival order information on data is not replaced. Also, the transmission standby TCP-ACK storage unit 1004 delivers the arrival order information on data highest in the transmission order among the stored TCP-ACK data in response to an arrival order information notice request from the output select unit 1006. Data highest in the transmission order is, for example, the TCP-ACK data first stored. Also, upon receiving a transmission enable instruction from the output select unit 1006, the transmission standby TCP-ACK storage unit 1004 outputs data including the TCP-ACK highest in the transmission order, and delivers the data to the MAC processing unit 102 through the output select unit 1006.

The transmission data buffer 1005 stores the transmission data received from the transmission data determination unit 1002 in the buffer. Also, the transmission data buffer 1005 delivers the arrival order information on data highest in the transmission order (data first stored in this example) among the stored transmission data in response to the arrival order information notice request from the output select unit 1006. Also, upon receiving the transmission enable instruction from the output select unit 1006, the transmission standby TCP-ACK storage unit 1004 outputs the transmission data highest in the transmission order, and delivers the transmission data to the MAC processing unit 102 through the output select unit 1006.

The output select unit 1006 requests the arrival order information notice from the transmission standby TCP-ACK storage unit 1004 and the transmission data buffer 1005, and acquires the respective arrival order information. Then, the output select unit 1006 determines which data is higher in the transmission priority, according to the acquired arrival order information. Also, upon receiving a transmission right acquisition notice from the MAC processing unit 102, the output select unit 1006 delivers data higher in the transmission order from the transmission standby TCP-ACK storage unit 1004 or the transmission data buffer 1005 to the MAC processing unit 102. Data higher in the transmission order means data earlier in the arrival order.

Figure 11:
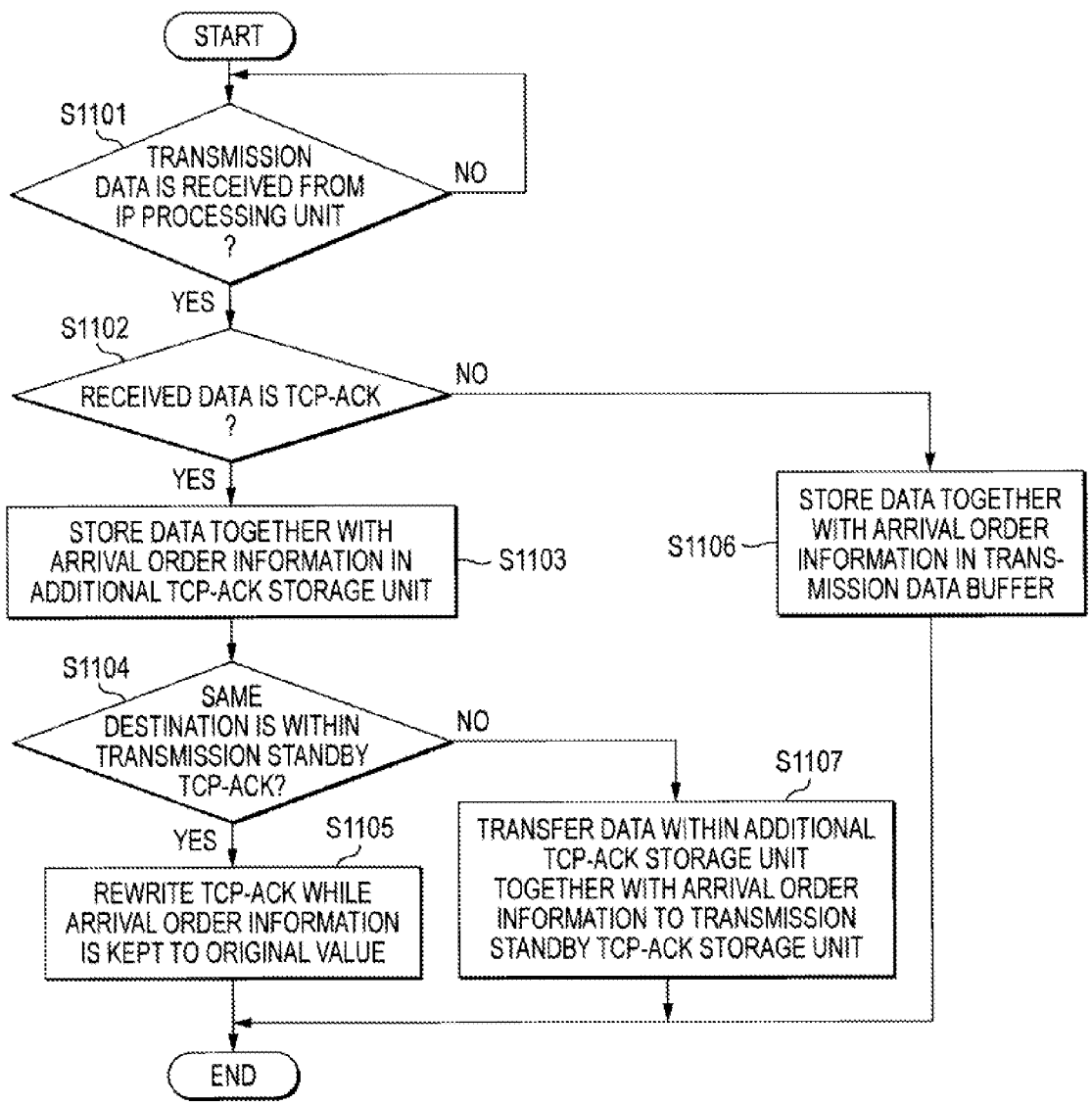
FIG. 11 is a flowchart for storing transmission data according to the fourth embodiment.

FIG. 11 is a flowchart for storing the transmission data in the communication terminal according to the fourth embodiment.

The transmission data determination unit 1002 within the transmission data select unit 1001 determines whether the transmission data has been received from the IP processing unit 104, or not, and waits for arrival of the transmission data (Step S1101). Upon receiving the transmission data from the IP processing unit 104 (yes in the determination of Step S1101), the transmission data determination unit 1002 determines whether the received transmission data is the TCP-ACK, or not (Step S1102).

If the transmission data is the TCP-ACK (yes in the determination of Step S1102), the transmission data determination unit 1002 stores the transmission data together with the arrival order information in the additional TCP-ACK storage unit 1003 (Step S1103). The transmission standby TCP-ACK storage unit 1004 searches whether the same destination as that of the TCP-ACK data stored in the additional TCP-ACK storage unit 1003 has been stored in the transmission standby TCP-ACK storage unit 1004, or not (Step S1104).

If the appropriate TCP-ACK data with the same destination exists (yes in the determination of Step S1104), the processing is advanced to Step S1105. The transmission standby TCP-ACK storage unit 1004 rewrites the appropriate transmission data stored therein to the TCP-ACK data stored in the additional TCP-ACK storage unit 1003 (Step S1105). In this situation, the arrival order information is not rewritten. Also, if the appropriate transmission data includes the TCP-DATA, only the TCP-ACK is rewritten. That is, the transmission standby TCP-ACK storage unit 1004 rewrites acknowledgement No of the TCP header, and again calculates checksum.

Also, if there is no appropriate TCP-ACK data of the same address (no in the determination of Step S1104), the processing is advanced to Step S1107. The transmission standby TCP-ACK storage unit 1004 transfers the TCP-ACK data stored in the additional TCP-ACK storage unit 1003 together with the arrival order information into the transmission standby TCP-ACK storage unit 1004 (Step S1107). Further, the transmission standby TCP-ACK storage unit 1004 clears information in the additional TCP-ACK storage unit 1003.

Also, if the determination of Step S1102 is no, that is, the transmission 2.5 data determination unit 1002 determines that the transmission data is not the TCP-ACK, the transmission data determination unit 1002 stores the transmission data together with the arrival order information in the transmission data buffer 1005 (Step S1106).

Figure 12:
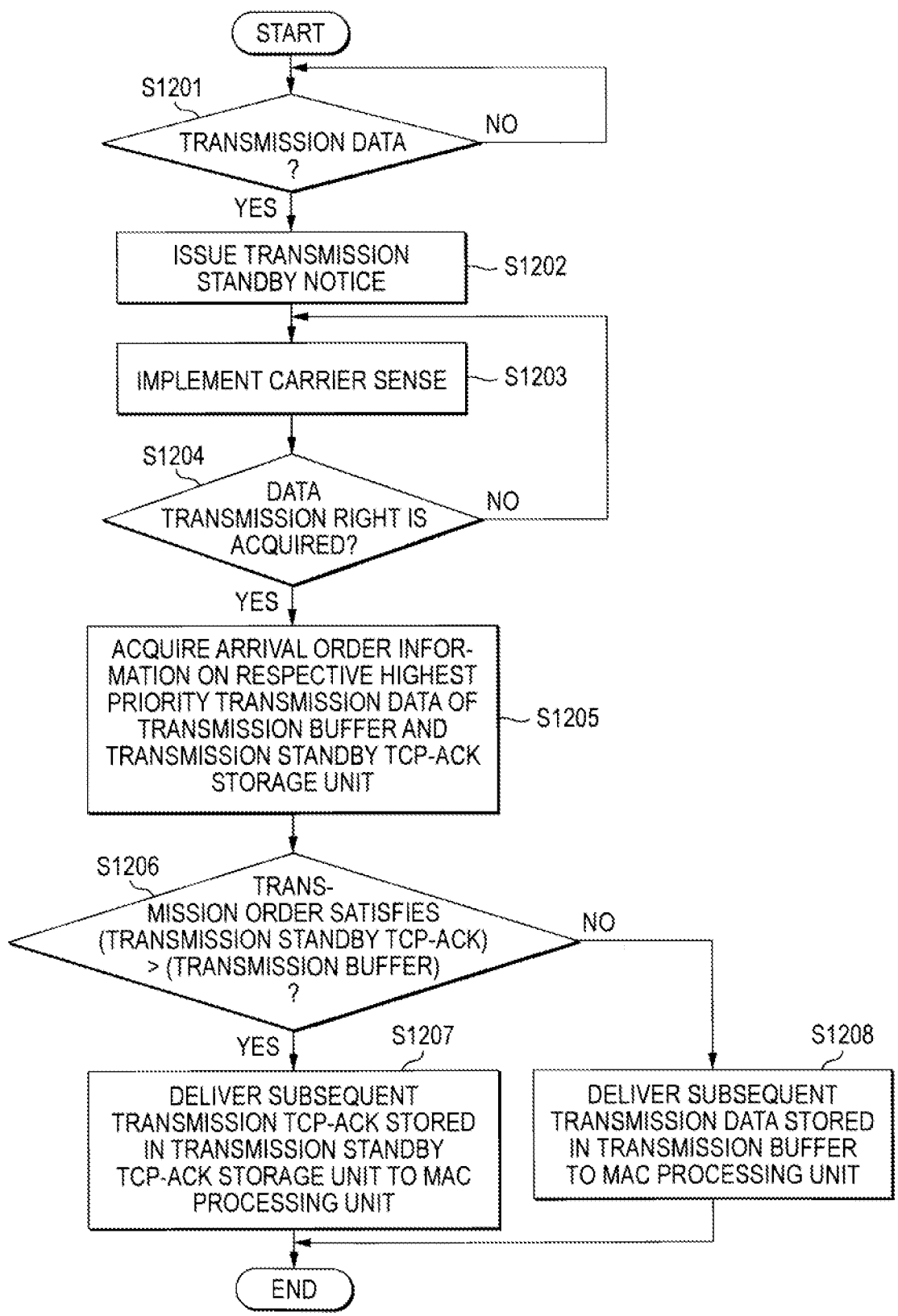
FIG. 12 is a flowchart for transmitting the transmission data according to the fourth embodiment.

FIG. 12 is a flowchart for transmitting the transmission data in the communication terminal according to the fourth embodiment.

The transmission data select unit 1001 determines whether there is the transmission data in any one of the transmission standby TCP-ACK storage unit 1004 and the transmission data buffer 1005, or not (Step S1201). If there is the transmission data (yes in the determination of Step S1201), the transmission data select unit 1001 sends a transmission standby notice indicative of the existence of the transmission standby data to the MAC processing unit 102 (Step S1202).

The MAC processing unit 102 that have received the transmission standby notice implements a transmission right acquisition attempt of data, that is, carrier sense (Step S1203). Then, the MAC processing unit 102 determines whether the transmission right has been acquired, or not, according to whether a carrier from another communication terminal has been detected, or not, on the basis of the result of the carrier sense (Step S1204).

As a result of the carrier sense, if the transmission right has been acquired (yes in the determination of Step S1204), the transmission right acquisition notice is sent to the transmission data select unit 1001 from the MAC processing unit 102. Upon receiving the transmission right acquisition notice, the output select unit 1006 within the transmission data select unit 1001 acquires the arrival order information on the highest priority transmission data stored in the transmission data buffer 1005. Likewise, the output select unit 1006 within the transmission data select unit 1001 acquires the arrival order information on the highest priority transmission data stored in the transmission standby TCP-ACK storage unit 1004 (Step S1205).

The output select unit 1006 determines which of the transmission data buffer 1005 or the transmission standby TCP-ACK storage unit 1004 is higher in the transmission priority of data, according to the arrival order information acquired in Step S1205 (Step S1206). In this case, if data within the transmission standby TCP-ACK storage unit 1004 is higher in priority, the output select unit 1006 delivers the TCP-ACK data of the highest priority within the transmission standby TCP-ACK storage unit 1004 to the MAC processing unit 102 (Step S1207).

On the other hand, if data within the transmission data buffer 1005 is higher in priority as a result of the determination in Step S1206, the output select unit 1006 delivers the transmission data of the highest priority within the transmission data buffer 1005 to the MAC processing unit 102 (Step S1208).

Figure 13:
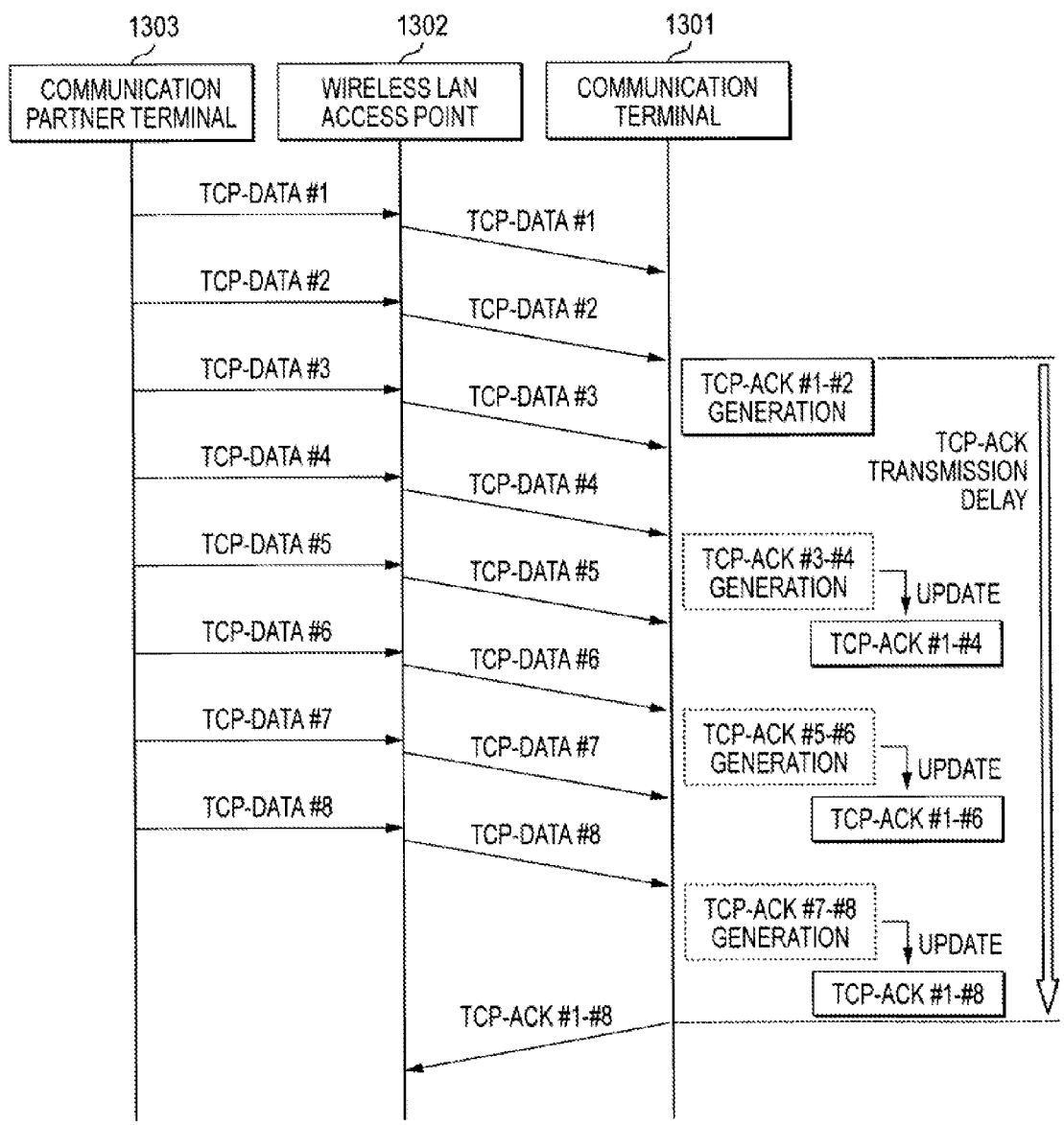
FIG. 13 is a sequence diagram illustrating an example of data transfer operation between a transmitter terminal and a receiver terminal according to the fourth embodiment.
Figure 14:
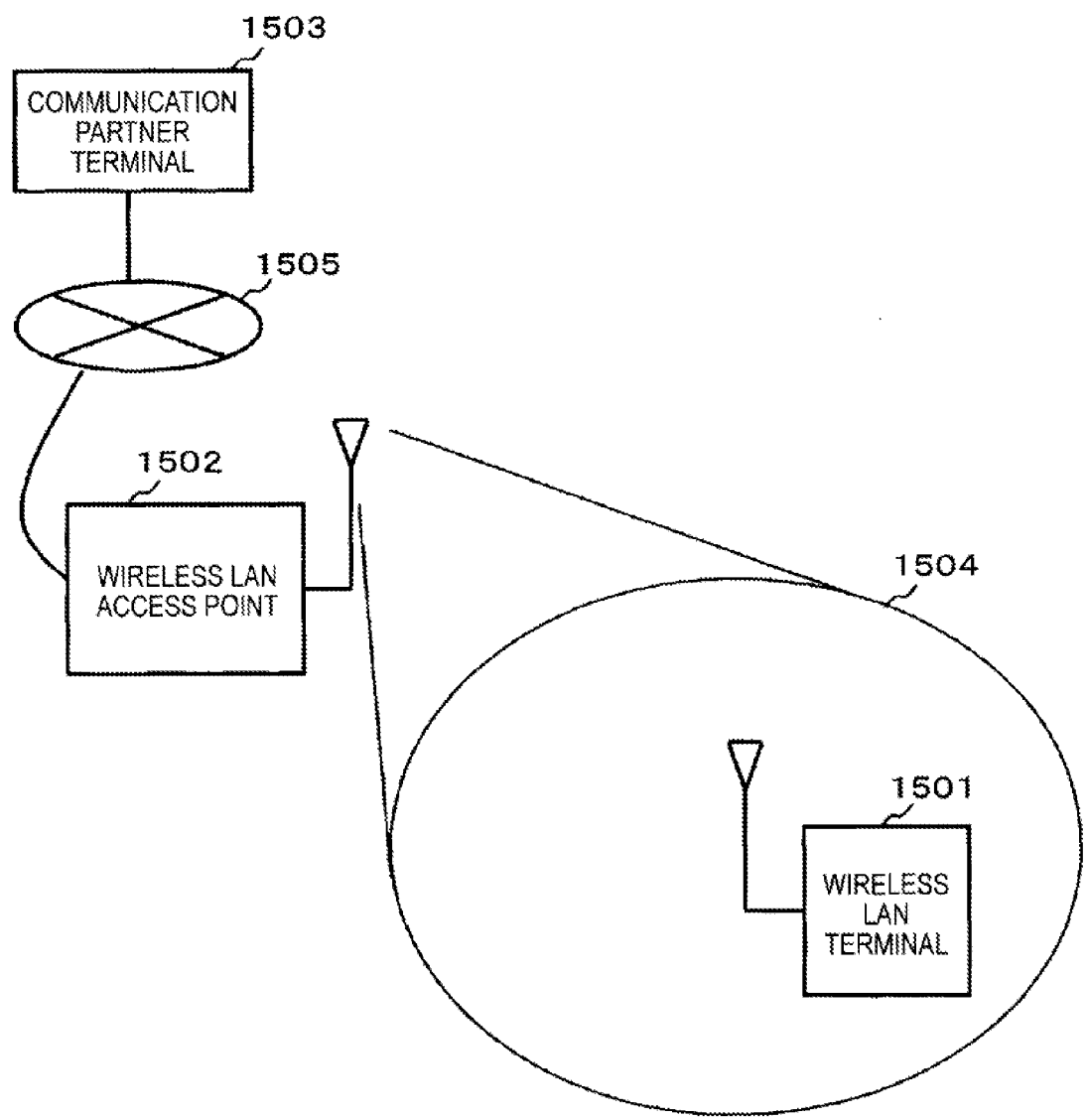
FIG. 14 is a diagram illustrating an example of a data communication system using a wireless LAN.
Figure 15:
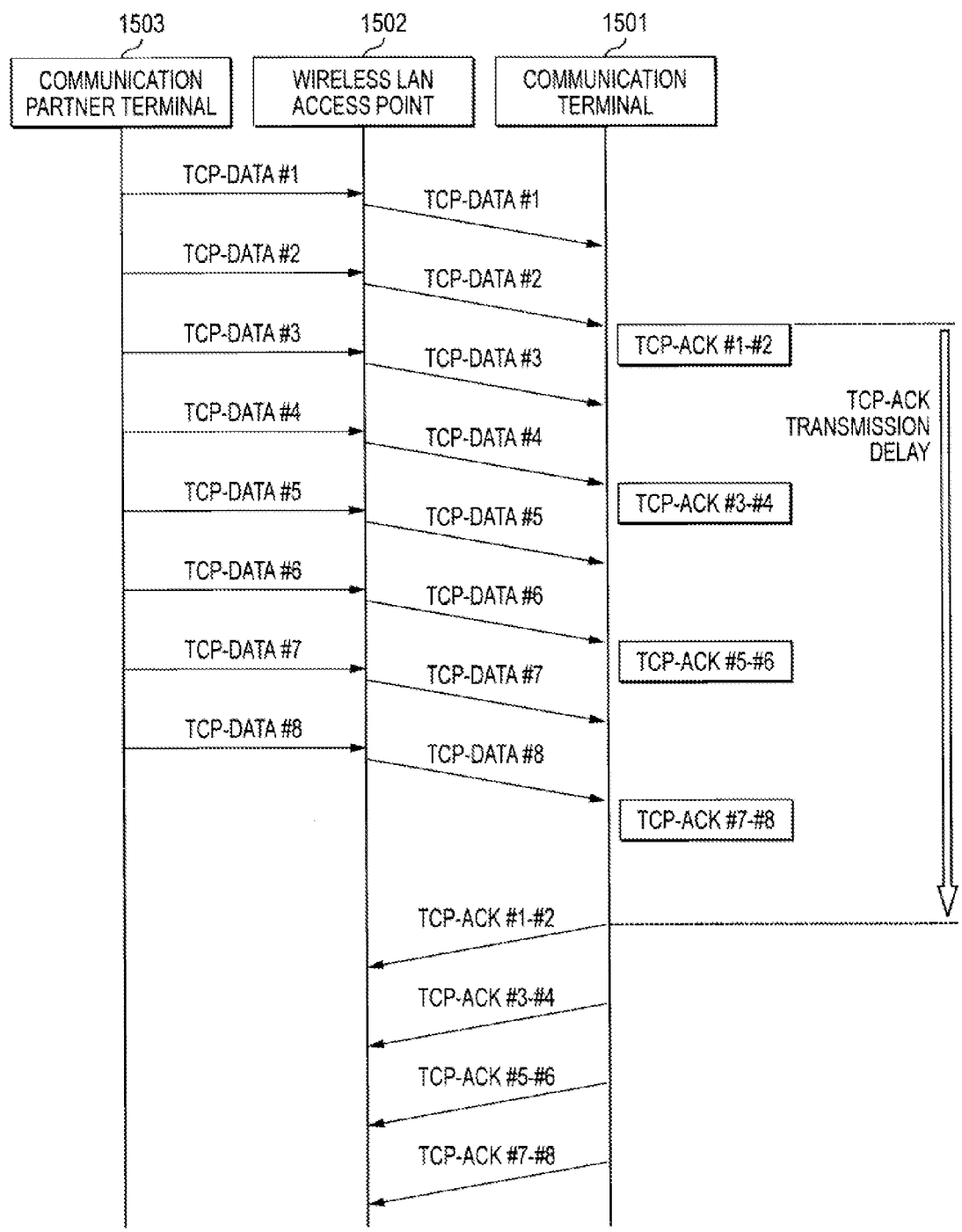
FIG. 15 is a sequence diagram illustrating an example of data transfer operation between a transmitter terminal and a receiver terminal when data is transferred in a bursty manner.

FIG. 13 is a sequence diagram illustrating an example of data transfer operation between the transmitter terminal and the receiver terminal according to the fourth embodiment. In the example shown in the figure, the TCP segment data is transmitted from a communication partner terminal 1303, which is the transmitter terminal, to a communication terminal (wireless LAN terminal) 1301, which is the receiver terminal, through a wireless LAN access point 1302 in a burst manner.

In this case, in the communication terminal 1301, since the number of receiving the data frames related to the session is large, and it takes time to acquire the transmission right, the transmission of the TCP-ACK is delayed at the normal TCP-ACK generation frequency. For that reason, the communication terminal 1301 updates the TCP-ACK until acquiring the transmission right, and transmits the TCP-ACK updated at the time of acquiring the transmission right.

In the example of FIG. 13, the communication terminal 1301 generates TCP-ACK #1 to #2 at the time of receiving TCP-DATA #1 to TCP-DATA #2, TCP-ACK #3 to #4 at the time of receiving TCP-DATA #3 to TCP-DATA #4, TCP-ACK #5 to #6 at the time of receiving TCP-DATA #5 to TCP-DATA #6, TCP-ACK #7 to #8 at the time of receiving TCP-DATA #7 to TCP-DATA #8, respectively, and updates the TCP-ACK.

As a result, the communication terminal 1301 brings the TCP-ACK at the time of delaying the transmission together. Then, if the communication terminal 1301 can acquire the transmission right at the time of receiving the TCP-DATA #8, the communication terminal 1301 returns the updated TCP-ACK #1 to #8 to the wireless LAN access point 1302. In this way, even if it takes time to transmit the TCP-ACK, the TCP-ACK that has been brought together after being updated is transmitted, thereby enabling the divided transmission of the TCP-ACK to be suppressed.

According to this embodiment as described above, if the TCP-ACK having the same destination as that of the transmission standby TCP-ACK is newly generated, those TCP-ACK can be brought together. This is effective under circumstances where the transmission standby of the TCP-ACK is liable to occur due to the transmission of the other terminal, that is, in a situation where the detention frequency of the transmission data is high, thereby making it difficult to obtain the transmission right immediately. That is, in this embodiment, the TCP-ACK having the same destination as that of the TCP-ACK sequentially generated until the transmission right of the TCP-ACK is obtained is replaced with the updated TCP-ACK.

With the above TCP-ACK generation processing, one TCP-ACK can notify the transmitter side of the reception acknowledgement of more pieces of TCP segment data. As a result, because the number of TCP-ACK transmissions can be reduced, the power consumption of the communication terminal can be reduced. Also, because the number of data frames to be transmitted to the communication media can be reduced by reducing the number of TCP-ACK transmissions, the throughput of the system can be improved.

In the above-mentioned embodiment, the arrival order information is time information managed by the system. Alternatively, information having an identifier incremented by 1 every time the transmission data is generated may be used. Also, the arrival order information may be a value resulting from weighting QoS information (transmission priority information).

Also, in this embodiment, the communication terminal configured in the fourth embodiment may be provided with any one of the transmission standby frequency estimation units in the first to third embodiments, and any one of the TCP processing units in the first to third embodiments. As a result, in this embodiment, under circumstances where the transmission standby of the TCP-ACK is liable to occur due to the transmission from the other terminal, because the TCP-ACK generation processing in the TCP processing unit 105 is reduced, a load on the system can be reduced.

Also, according to this embodiment, in the communication system that conducts the half-duplex communication, the TCP-ACK generation timing in the TCP layer is controlled according to the carrier sense situation in the MAC layer, thereby enabling the divided transmission of the TCP-ACK to be suppressed. Also, in this embodiment, in the circumstances where the transmission standby frequently occurs in the TCP communication, and the transmission of the TCP-ACK is delayed, the number of TCP-ACK transmissions can be reduced, thereby enabling the efficiency of the TCP communication processing to be realized. As a result, in this embodiment, it is possible to reduce the power consumption of the communication terminal and improve the throughput of the system.

According to the present invention, modifications and applications by an ordinary skilled person on the basis of the disclosure of the present specification and known techniques without departing from the subject matter and scope of the present invention are also intended by the present invention, and included in a scope to be protected. Also, the respective components in the above embodiments may be arbitrarily combined together without departing from the subject matter of the present invention.

In the above-mentioned embodiment, the configurations and operation of the PHY processing unit 101 and the MAC processing unit 102 are described in the example in which the PHY processing unit 101 and the MAC processing unit 102 are applied to the communication terminal connected to the wireless LAN. However, the present invention is not limited to those configurations and operation. In this embodiment, the communication system or the communication system which conduct the half-duplex communication may be a communication apparatus used in, for example, a PLC (power line communications).

In the above respective embodiments, the example in which the present invention is configured by hardware is described. However, the present invention can be also realized by software.

Also, the respective function blocks used for description of the above respective embodiments are typically realized as an LSI that is an integrated circuit. The PHY processing unit 101, the MAC processing unit 102, the transmission standby frequency estimation units 103, 601, 801, the IP processing unit 104, the TCP processing unit 105, the TCP-ACK generation control unit 106, the terminal control unit 107, and the transmission data select unit 1001 are typically realized by the LSI that is the integrated circuit. Those components may be integrated into one chip, individually, or a part or all of those components may be integrated into one chip. The LSI described here can be called "IC, "system LSI", "super LSI", or "ultra LSI" due to a difference in the degree of integration.

Also, a manner for integrating the circuit is not limited to the LSI, but may be realized by a dedicated circuit or a general-purpose processor. There may be applied an FPGA (field programmable gate array) that can be programmed after the LSI is manufactured, or a reconfigurable processor that can reconstruct the connection or setting of a circuit cell within the LSI.

Further, if a technique for integrating the circuit to be replaced by the LSI appears due to development of the semiconductor technology or another technique derived from the semiconductor technology, the integration of the function blocks may be conducted by using the technique. A biotechnology may be applied.

The present invention is based on Japanese Patent Application No. 2009-252237 filed on Nov. 2, 2009, and the content of which is incorporated herein by reference.

INDUSTRIAL APPLICABILITY

The communication terminal and the communication method according to the present invention have advantages that the divided transmission of the TCP-ACK in the TCP communication can be suppressed to efficiently conduct acknowledgement, and in particular, is useful for communication terminals and household electric appliances, which conduct TCP/IP communication with the use of a half-duplex communication link such as a wireless LAN. Also, the communication terminal and the communication method according to the present invention can be also applied to on-vehicle communication devices that are connected to an on-vehicle LAN and conduct the ICP/IP communication, and cellular phones having a domestic network communication network therein as intended purposes.

REFERENCE SIGNS LIST

101, PHY processing unit
102, MAC processing unit
103, 601, 801, transmission standby frequency estimation unit
104, IP processing unit
105, TCP processing unit
106, TCP-ACK generation control unit
107, terminal control unit
201, interval timer
202, received data frame number counter
203, 603, 803, detention frequency threshold management unit
204, 604, 804, detention estimate information calculation unit
501, 1301, communication terminal
502, 1302, wireless LAN access point
503, 1303, communication partner terminal
602, carrier detection number counter
802, TCP-DATA receive number counter
1001, transmission data select unit
1002, transmission data determination unit
1003, additional TCP-ACK storage unit
1004, transmission standby TCP-ACK storage unit
1005, transmission data buffer
1006, output select unit

The invention claimed is:

1. A communication terminal which communicates with at least one communication terminal by using a TCP protocol, the communication terminal comprising:
a transmission standby frequency estimation unit that estimates a frequency at which transmission standby is executed since transmission data including a TCP acknowledgement segment arrives at a media access control processing unit of a subject communication terminal until the TCP acknowledgement segment is transmitted to communication media; and
a TCP acknowledgement generation control unit that changes a generation frequency of the TCP acknowledgement segment on the basis of the estimated transmission standby frequency information,
wherein the TCP acknowledgement generation control unit decreases the generation frequency of the TCP acknowledgement segment when the transmission standby frequency estimation unit estimates that the transmission standby frequency is higher than a predetermined value, and
wherein the transmission standby frequency estimation unit includes a received data number calculation unit that calculates the number of received data in a predetermined period, estimates that the transmission standby frequency is high when the number of received data is larger than a predetermined value, and estimates that the transmission standby frequency is low when the number of received data is smaller than the predetermined value, on the basis of the number of received data in the predetermined period.

2. A communication terminal which communicates with at least one communication terminal by using a TCP protocol, the communication terminal comprising:
a transmission standby frequency estimation unit that estimates a frequency at which transmission standby is executed since transmission data including a TCP acknowledgement segment arrives at a media access control processing unit of a subject communication terminal until the TCP acknowledgement segment is transmitted to communication media; and
a TCP acknowledgement generation control unit that changes a generation frequency of the TCP acknowledgement segment on the basis of the estimated transmission standby frequency information,
wherein the TCP acknowledgement generation control unit decreases the generation frequency of the TCP acknowledgement segment when the transmission standby frequency estimation unit estimates that the transmission standby frequency is higher than a predetermined value, and
wherein the transmission standby frequency estimation unit includes a transmission detection number recording unit that records the number of detecting the transmissions from another terminal since the transmission data is generated until the transmission data is transmitted to the communication media, estimates that the transmission standby frequency is high when the number of detections is larger than a predetermined value, and estimates that the transmission standby frequency is low when the number of detections is smaller than the predetermined value, on the basis of the number of transmission detections from the another terminal.

3. A communication terminal which communicates with at least one communication terminal by using a TCP protocol, the communication terminal comprising:
a transmission standby frequency estimation unit that estimates a frequency at which transmission standby is executed since transmission data including a TCP acknowledgement segment arrives at a media access control processing unit of a subject communication terminal until the TCP acknowledgement segment is transmitted to communication media; and
a TCP acknowledgement generation control unit that changes a generation frequency of the TCP acknowledgement segment on the basis of the estimated transmission standby frequency information,
wherein the TCP acknowledgement generation control unit decreases the generation frequency of the TCP acknowledgement segment when the transmission standby frequency estimation unit estimates that the transmission standby frequency is higher than a predetermined value, and
wherein the transmission standby frequency estimation unit includes a TCP data receive number recording unit that records the number of receiving TCP data from a source terminal of a TCP acknowledgement segment since the TCP acknowledgement segment is generated until the TCP acknowledgement segment is transmitted to the communication media, estimates that the transmission standby frequency is high when the number of receptions is larger than a predetermined value, and estimates that the transmission standby frequency is low when the number of receptions is smaller than the predetermined value, on the basis of the number of receiving the TCP data from the source terminal of the TCP acknowledgement segment.

4. A communication method in a communication terminal which communicates with at least one communication terminal by using a TCP protocol, the communication method comprising the steps of:
estimating a frequency at which transmission standby is executed since transmission data including a TCP acknowledgement segment arrives at a media access control processing unit of a subject communication terminal until the TCP acknowledgement segment is transmitted to communication media; and
changing a generation frequency of the TCP acknowledgement segment so as to decrease the generation frequency of the TCP acknowledgement segment when it is estimated that the transmission standby frequency is higher than a predetermined value, on the basis of the estimated transmission standby frequency information,
wherein the step of estimating the transmission standby frequency includes the steps of:
calculating the number of received data in a predetermined period; and
estimating that the transmission standby frequency is high when the number of received data is larger than the predetermined value, and estimating that the transmission standby frequency is low when the number of received data is smaller than the predetermined value, on the basis of the number of received data in the predetermined period.

5. A communication method in a communication terminal which communicates with at least one communication terminal by using a TCP protocol, the communication method comprising the steps of:
estimating a frequency at which transmission standby is executed since transmission data including a TCP acknowledgement segment arrives at a media access control processing unit of a subject communication terminal until the TCP acknowledgement segment is transmitted to communication media; and
changing a generation frequency of the TCP acknowledgement segment so as to decrease the generation frequency of the TCP acknowledgement segment when it is estimated that the transmission standby frequency is higher than a predetermined value, on the basis of the estimated transmission standby frequency information,
wherein the step of estimating the transmission standby frequency includes the steps of:
recording the number of detecting the transmissions from another terminal since the transmission data is generated until the transmission data is transmitted to the communication media; and
estimating that the transmission standby frequency is high when the number of detections is larger than a predetermined value, and estimating that the transmission standby frequency is low when the number of detections is smaller than the predetermined value, on the basis of the number of transmission detections from the another terminal.

6. A communication method in a communication terminal which communicates with at least one communication terminal by using a TCP protocol, the communication method comprising the steps of:
estimating a frequency at which transmission standby is executed since transmission data including a TCP acknowledgement segment arrives at a media access control processing unit of a subject communication terminal until the TCP acknowledgement segment is transmitted to communication media; and changing a generation frequency of the TCP acknowledgement segment so as to decrease the generation frequency of the TCP acknowledgement segment when it is estimated that the transmission standby frequency is higher than a predetermined value, on the basis of the estimated transmission standby frequency information, wherein the step of estimating the transmission standby frequency includes the steps of:

recording the number of receiving TCP data from a source terminal of a TCP acknowledgement segment since the TCP acknowledgement segment is generated until the TCP acknowledgement segment is transmitted to the communication media; and estimating that the transmission standby frequency is high when the number of receptions is larger than a predetermined value, and estimating that the transmission standby frequency is low when the number of receptions is smaller than the predetermined value, on the basis of the number of receiving the TCP data from the source terminal of the TCP acknowledgement segment.

* * * * *